United States Patent
Ohtani et al.

(10) Patent No.: US 7,911,177 B2
(45) Date of Patent: Mar. 22, 2011

(54) AC MOTOR DRIVE CONTROLLER

(75) Inventors: Hiroki Ohtani, Aichi-gun (JP); Hideto Hanada, Toyota (JP); Makoto Nakamura, Okazaki (JP); Kenji Yamada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/451,975

(22) PCT Filed: Jun. 18, 2008

(86) PCT No.: PCT/JP2008/061500
§ 371 (c)(1),
(2), (4) Date: Dec. 10, 2009

(87) PCT Pub. No.: WO2008/156194
PCT Pub. Date: Dec. 24, 2008

(65) Prior Publication Data
US 2010/0127656 A1 May 27, 2010

(30) Foreign Application Priority Data
Jun. 18, 2007 (JP) .................... 2007-160725

(51) Int. Cl.
*H02P 27/04* (2006.01)
(52) U.S. Cl. ........ 318/811; 318/810; 318/807; 318/767; 318/727
(58) Field of Classification Search .............. 318/811, 318/810, 807, 767, 727
See application file for complete search history.

(56) References Cited

U.S. PATENT DOCUMENTS

| | | | |
|---|---|---|---|
| 6,541,939 B2 * | 4/2003 | Kishibe et al. | 318/799 |
| 6,777,897 B2 * | 8/2004 | Murai | 318/400.2 |
| 7,242,163 B2 * | 7/2007 | Gallegos-Lopez et al. | 318/812 |
| 7,642,737 B2 * | 1/2010 | Bae et al. | 318/400.02 |

FOREIGN PATENT DOCUMENTS

| | | |
|---|---|---|
| JP | A-2-290185 | 11/1990 |
| JP | A-7-79570 | 3/1995 |
| JP | A-7-194130 | 7/1995 |
| JP | B2-2607488 | 2/1997 |
| JP | A-2005-160185 | 6/2005 |
| JP | A-2006-230079 | 8/2006 |
| JP | A-2007-74796 | 3/2007 |
| JP | A-2007-143316 | 6/2007 |

OTHER PUBLICATIONS

International Search Report for International Application No. PCT/JP2008/061500, issued Sep. 16, 2008.

* cited by examiner

*Primary Examiner* — Walter Benson
*Assistant Examiner* — David S Luo
(74) *Attorney, Agent, or Firm* — Oliff & Berridge, PLC

(57) ABSTRACT

An overmodulation PWM controller includes a voltage instruction calculation unit which calculates a d axis voltage instruction and a q axis voltage instruction in which a voltage amplitude exceeds a peak value of a triangular wave carrier; a voltage instruction correction unit which corrects the d axis voltage instruction and the q axis voltage instruction so that a pulse width modulation voltage applied to an AC motor has a fundamental wave amplitude corresponding to the voltage instruction amplitude, according to the synchronization value K which is the number of the triangular carriers per one cycle of the phase voltage instruction; and a voltage instruction conversion unit which converts the corrected d axis voltage instruction and the q axis voltage instruction into a phase voltage instruction. The pulse width modulation voltage is controlled according to the result of comparison between the phase voltage instruction and the triangular wave carrier.

7 Claims, 21 Drawing Sheets

PHASE OF VOLTAGE INSTRUCTION AND TRIANGULAR WAVE CARRIER 90deg

PHASE OF VOLTAGE INSTRUCTION AND TRIANGULAR WAVE CARRIER 180deg

PHASE OF VOLTAGE INSTRUCTION AND TRIANGULAR WAVE CARRIER 270deg

AC MOTOR DRIVE CONTROLLER

TECHNICAL FIELD

The present invention relates to an alternating current (AC) motor drive controller, and more particularly to an AC motor drive controller which performs overmodulation PWM control.

BACKGROUND ART

In order to drive an alternating current (AC) motor by means of a direct current power source, a driving method in which an inverter is employed is being adopted. Switching of an inverter is controlled by an inverter driver circuit, so that, based on the result of comparison between a voltage instruction and a triangular wave carrier, a pulse width modulation (PWM) voltage which is output from the inverter and applied to the AC motor is controlled, for example.

Overmodulation PWM control has been proposed so as to increase the amplitude of a fundamental wave component of the pulse width modulation voltage to be applied to the AC motor (see JP 7-194130A, JP 7-79570 A, and so on). In the overmodulation PWM control, the pulse width modulation voltage to be applied to the AC motor is controlled based on the result of comparison between a voltage instruction in which an amplitude exceeds a peak value of a triangular wave carrier, and the triangular wave carrier.

In overmodulation PWM control in which a phase voltage instruction amplitude exceeds a peak value of a triangular wave carrier, the amplitude of a fundamental wave component of the pulse width modulation voltage output from the inverter does not increase linearly with respect to a linear increase in the phase voltage instruction amplitude and is smaller than the phase voltage instruction amplitude. To address this disadvantage, in JP 7-194130 A, a voltage instruction E is calculated from the following formula (1) to perform linear compensation of the voltage instruction E. In formula (1), A represents a percent modulation and $E_d$ represents a direct current (DC) voltage to be input to the inverter.

[Formula 1]

$$E = \frac{1}{2}\left\{A\sin^{-1}\frac{1}{A} + \sqrt{1 - \frac{1}{A^2}}\right\}E_{max} \quad (1)$$

Here, $$E_{max} = \frac{\sqrt{2}}{\pi}E_d$$

However, according to formula (1), a waveform (continuous values) which is obtained by clamping a phase voltage instruction value having a sinusoidal wave with half the direct current voltage to be input to the inverter is obtained. Accordingly, when the number of triangular wave carriers per one cycle of a voltage instruction is sufficiently large, a pulse which is output by PWM is substantially equal to the continuous values of waveform described above and therefore formula (1) is substantially satisfied, whereas when the number of triangular wave carriers per one cycle of a phase voltage instruction is reduced, formula (1) cannot be satisfied. Consequently, the fundamental wave amplitude corresponding to the phase voltage instruction amplitude cannot be obtained, resulting in a reduction of controllability of overmodulation PWM control.

DISCLOSURE OF THE INVENTION

Therefore, the present invention provides an AC motor drive controller which is capable of stably controlling a fundamental wave amplitude of a pulse width modulation voltage to be applied to an AC motor to conform to a phase voltage instruction amplitude.

According to an aspect of the invention, there is provided an AC motor drive controller, including an AC motor; an inverter; and an overmodulation PWM controller which controls a pulse width modulation voltage which is output from the inverter and which is to be applied to the AC motor, based on a result of comparison between a phase voltage instruction in which an amplitude exceeds a peak value of a triangular wave carrier and the triangular wave carrier, wherein the overmodulation PWM controller includes: a voltage instruction calculation unit which calculates a d-axis voltage instruction and a q-axis voltage instruction such that a d-axis current and a q-axis current which are detected correspond to the d-axis current instruction and the q-axis current instruction; a voltage amplitude calculator which calculates a voltage instruction amplitude from the d-axis voltage instruction and the q-axis voltage instruction calculated by the voltage instruction calculation unit; a voltage instruction correction unit which corrects the d-axis voltage instruction and the q-axis voltage instruction calculated by the voltage instruction calculation unit, such that a pulse width modulation voltage has a fundamental wave amplitude corresponding to the voltage instruction amplitude calculated by the voltage amplitude calculator; a voltage instruction conversion unit which converts the d-axis voltage instruction and the q-axis voltage instruction which are corrected into a phase voltage instruction and outputs the phase voltage instruction; and a synchronization PWM controller which controls a phase of the phase voltage instruction from the voltage instruction conversion unit and the triangular wave carrier, and wherein the voltage instruction correction unit corrects the d-axis voltage instruction and the q-axis voltage instruction calculated by the voltage instruction calculation unit in accordance with the synchronization number, which is the number of the triangular wave carriers per one cycle of the phase voltage instruction.

In one aspect of the present invention, preferably, the voltage instruction correction unit corrects the d-axis voltage instruction and the q-axis voltage instruction calculated by the voltage instruction calculation unit by using amplitude characteristics having different relationships between the voltage instruction amplitude and the fundamental wave amplitude of the pulse width modulation voltage depending on the synchronization number.

In another aspect of the present invention, preferably, the synchronization PWM controller determines the synchronization number based on the rotational speed of the AC motor.

In accordance with a further aspect of the invention, there is provided an AC motor drive controller, including an AC motor; an inverter; and an overmodulation PWM controller which controls a pulse width modulation voltage which is output from the inverter and which is to be applied to the AC motor, based on a result of comparison between a phase voltage instruction in which an amplitude exceeds a peak value of a triangular wave carrier and the triangular wave carrier, wherein the overmodulation PWM controller includes: a voltage instruction calculation unit which calculates a d-axis voltage instruction and a q-axis voltage instruction such that a d-axis current and a q-axis current which are detected correspond to the d-axis current instruction and the q-axis current instruction; a voltage amplitude calculator which calculates a voltage instruction amplitude from the d-axis voltage instruction and the q-axis voltage instruction calculated by the voltage instruction calculation unit; a voltage instruction correction unit which corrects the d-axis voltage instruction and the q-axis voltage instruction calculated by the voltage instruction calculation unit, such that a pulse width modulation voltage has a fundamental wave amplitude corresponding to the voltage instruction amplitude calculated by the voltage amplitude calculator; a voltage instruction conversion unit which converts the d-axis voltage instruction and the q-axis voltage instruction which are corrected into a phase voltage instruction and outputs the phase voltage instruction; and a synchronization PWM controller which controls a phase of the phase voltage instruction from the voltage instruction conversion unit and the triangular wave carrier, and wherein the phase voltage instruction which is compared with the triangular wave carrier is updated for each predetermined cycle, and the voltage instruction correction unit corrects the d-axis voltage instruction and the q-axis voltage instruction calculated by the voltage instruction calculation unit in accordance with update timing of the phase voltage instruction.

In one aspect of the present invention, preferably, the voltage instruction correction unit corrects the d-axis voltage instruction and the q-axis voltage instruction calculated by the voltage instruction calculation unit by using amplitude characteristics having different relationships between the voltage instruction amplitude and the fundamental wave amplitude of the pulse width modulation voltage depending on the update timing of the phase voltage instruction.

In another aspect of the present invention, preferably, there are further provided a sinusoidal wave PWM controller which controls a pulse width modulation voltage which is output from the inverter and which is to be applied to the AC motor, based on a result of comparison between a phase voltage instruction in which an amplitude does not exceed a peak value of a triangular wave carrier and the triangular wave carrier, and a control switching unit which selectively switches between the sinusoidal wave PWM controller and the overmodulation PWM controller serving as a controller which controls the voltage to be applied to the AC motor.

In a further aspect of the present invention, preferably, there are further provided a sinusoidal wave PWM controller which controls a pulse width modulation voltage which is output from the inverter and which is to be applied to the AC motor, based on a result of comparison between a phase voltage instruction in which an amplitude does not exceed a peak value of a triangular wave carrier and the triangular wave carrier, a rectangular wave voltage controller which controls a phase of a rectangular wave voltage in which one pulse is output per one cycle of the phase voltage instruction, to control a rectangular wave voltage which is output from the inverter and which is to be applied to the AC motor, and a control switching unit which selectively switches among the sinusoidal wave PWM controller, the overmodulation PWM controller, and the rectangular wave voltage controller, serving as a controller which controls the voltage to be applied to the AC motor.

According to the present invention, in overmodulation PWM control, a fundamental wave amplitude of a pulse width modulation voltage to be applied to an AC motor can be stably controlled to conform to a phase voltage instruction amplitude.

BRIEF DESCRIPTION OF THE DRAWINGS

These and other objects of the invention will be explained in the below description by reference to the accompanying drawings, in which.

BEST MODE FOR CARRYING OUT THE INVENTION

A preferred embodiment of the present invention will be described with reference to the drawings.

Figure 1:
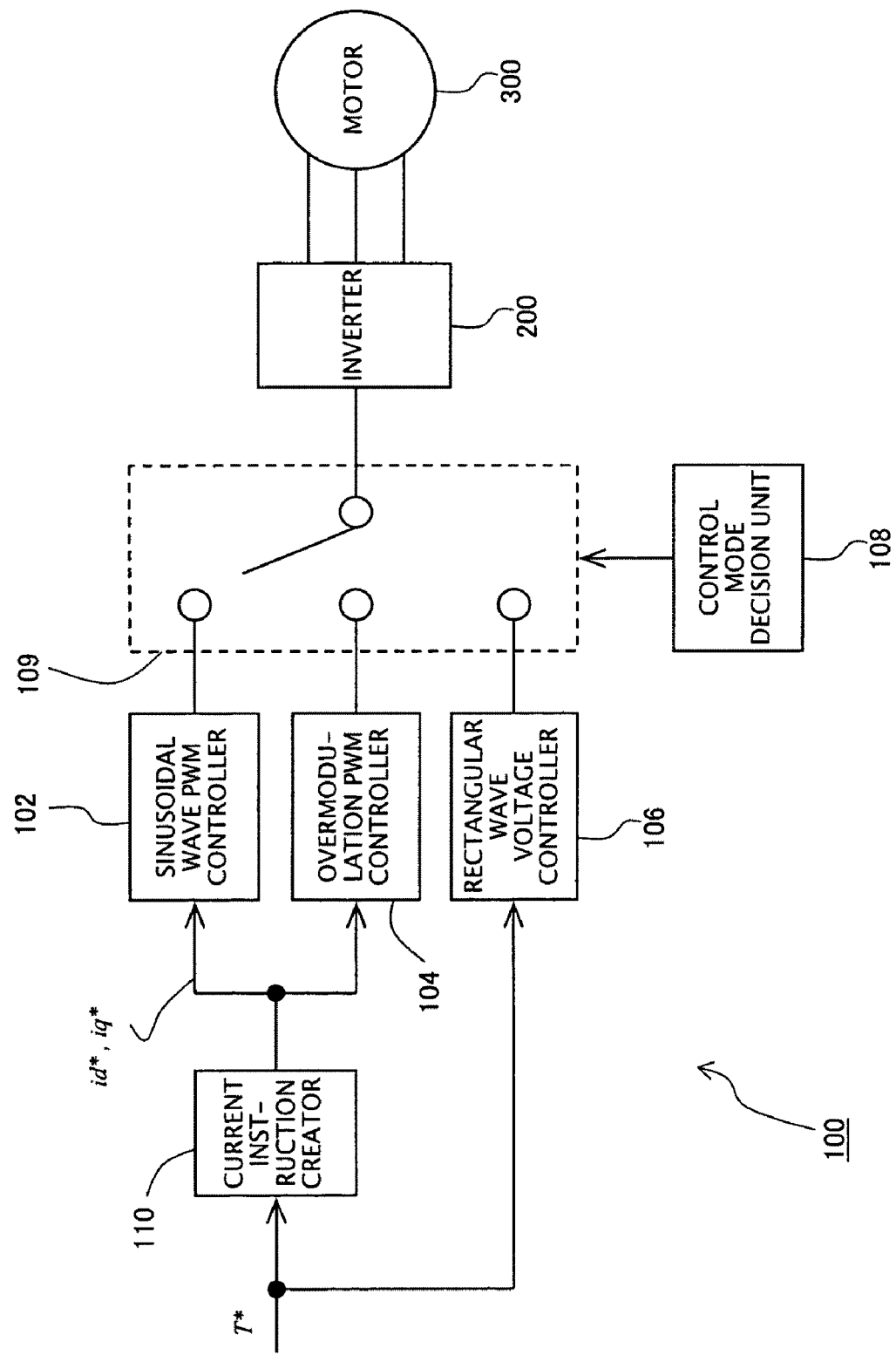
FIG. 1 is a block diagram schematically illustrating a structure of an AC motor drive controller according to an embodiment of the present invention.
Figure 2:
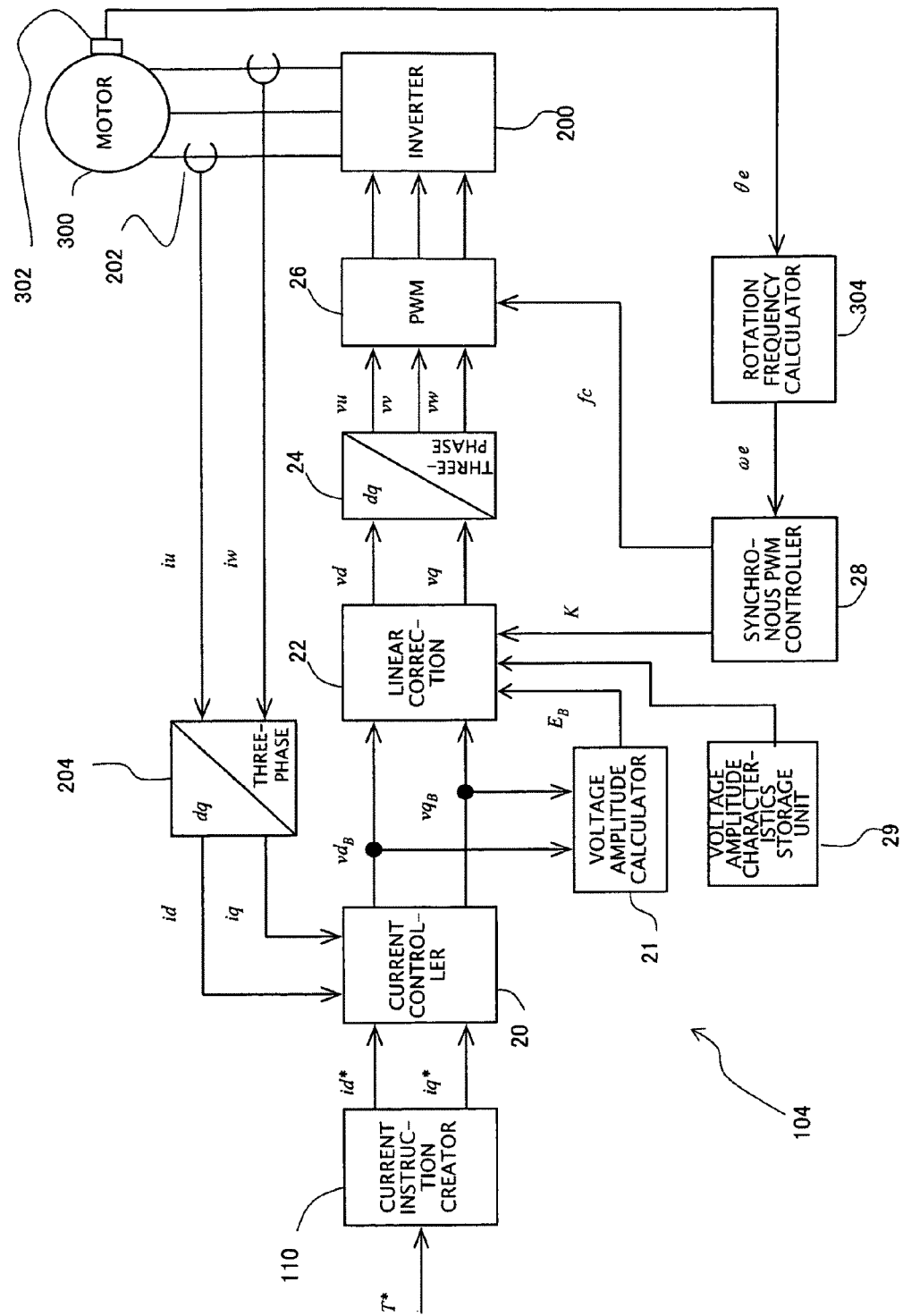
FIG. 2 is a block diagram schematically illustrating a structure of an overmodulation PWM controller for use in the AC motor drive controller according to the embodiment of the present invention.

FIGS. 1 and 2 are block diagrams schematically illustrating a structure of an AC motor drive controller 100 according to an embodiment of the present invention. Specifically, FIG. 1 schematically illustrates the overall structure of the drive controller 100 and FIG. 2 schematically illustrates the structure of an overmodulation PWM controller 104. The drive controller 100 according to the present embodiment includes a sinusoidal wave PWM controller 102, the overmodulation PWM controller 104, a rectangular wave voltage controller 106, a control mode decision unit 108, a switching unit 109, and a current instruction creator 110.

Figure 3:
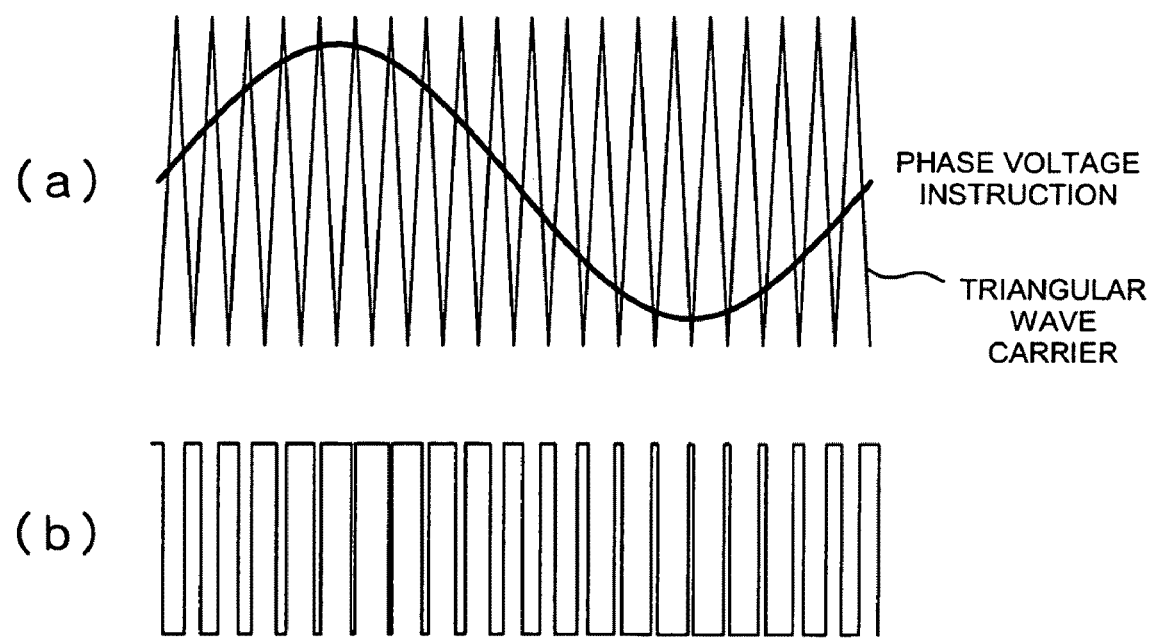
FIG. 3 is a view for explaining modulation processing in a sinusoidal wave PWM controller.

The current instruction creator 110, based on a torque instruction T* of an AC motor 300, a d-axis current instruction id*, and a q-axis current instruction iq*. The sinusoidal wave PWM controller 102 calculates a d-axis voltage instruction and a q-axis voltage instruction such that a d-axis current value id and a q-axis current value iq which are detected correspond to the d-axis current instruction id* and the q-axis current instruction iq*, respectively, and generates a phase voltage instruction (sinusoidal wave modulation wave) by means of coordinate conversion. The sinusoidal wave PWM controller 102 then compares this phase voltage instruction with a triangular wave carrier as illustrated in FIG. 3(a) to generate a switching instruction signal (a pulse width modulation signal) having a pulse width corresponding to the voltage instruction amplitude as illustrated in FIG. 3(b). The sinusoidal wave PWM controller 102 generates a phase voltage instruction having an amplitude which does not exceed a peak value of the triangular wave carrier as illustrated in FIG. 3(a). The switching instruction signal which is based on the result of comparison between this phase voltage instruction and the triangular wave carrier is supplied via the switching unit 109 to an inverter 200, so that sinusoidal wave PWM control is performed to control the voltage (pulse width modulation voltage) which is output from the inverter and applied to the AC motor 300.

Figure 4:
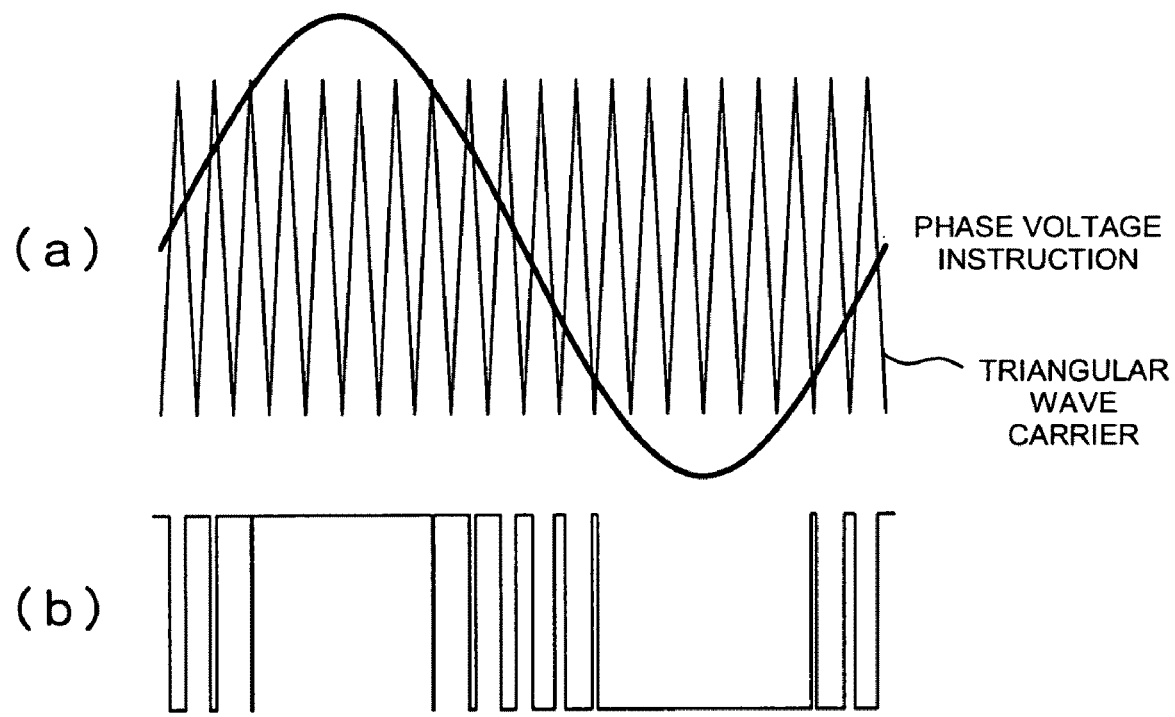
FIG. 4 is a view for explaining modulation processing in an overmodulation PWM controller.

The overmodulation PWM controller 104 calculates a d-axis voltage instruction and a q-axis voltage instruction such that the d-axis current value id and the q-axis current value iq which are detected correspond to the d-axis current instruction id* and the q-axis current instruction iq*, respectively, and generates a phase voltage instruction (sinusoidal wave modulation wave) by means of coordinate conversion. The overmodulation PWM controller 104 then compares this phase voltage instruction with a triangular wave carrier as illustrated in FIG. 4(a) to generate a switching instruction signal (a pulse width modulation signal) having a pulse width corresponding to the voltage instruction amplitude as illustrated in FIG. 4(b). The overmodulation PWM controller 104 generates a phase voltage instruction having an amplitude which exceeds a peak value of the triangular wave carrier as illustrated in FIG. 4(a), and then generates a switching instruction signal having a pulse width which is longer than the cycle of a triangular wave carrier as illustrated in FIG. 4(b). The switching instruction signal which is generated in the overmodulation PWM controller 104 is supplied via the switching unit 109 to the inverter 200, so that overmodulation PWM control is performed to control the voltage (pulse width modulation voltage) which is output from the inverter and applied to the AC motor 300.

The rectangular wave voltage controller 106 generates a voltage phase $\phi v$ such that an output torque or an estimated torque of the AC motor 300 corresponds to the torque instruction T*, and, based on this voltage phase $\phi v$, controls the phase of a rectangular wave voltage, in which one pulse is output per one cycle of the phase voltage instruction. The rectangular wave voltage which is output from the rectangular wave voltage controller 106 is supplied via the switching unit 109 to the inverter 200, so that rectangular wave voltage control is performed to control the voltage (rectangular voltage) which is output from the inverter 200 and applied to the AC motor 300.

The switching unit 109 selectively supplies to the inverter 200 one of the switching instruction signal from the sinusoidal wave PWM controller 102, the switching instruction signal from the overmodulation PWM controller 104, and the rectangular wave voltage from the rectangular wave voltage controller 106. The control mode decision unit 108 performs switching control of the switching unit 109, to thereby selectively switch among the sinusoidal wave PMW controller 102, the overmodulation PWM controller 104, and the rectangular wave voltage controller 106, for selecting a controller which controls the voltage which is output from the inverter 200 and applied to the AC motor 300. In other words, the control mode decision unit 108 selectively switches the control mode for the AC motor 300 among the sinusoidal wave PWM control, the overmodulation PWM control, and the rectangular wave voltage control. A specific example operation of the control mode decision unit 108 for selectively switching the control mode for the AC motor 300 will be described below.

The inverter 200 includes a voltage-type inverter circuit. The inverter 200, upon receiving the switching instruction signal from the sinusoidal wave PWM controller 102, the switching instruction signal from the overmodulation PWM controller 104, or the rectangular wave voltage from the rectangular wave voltage controller 106, generates a three-phase pseudo sinusoidal wave voltage, which is applied to the AC motor 300. The AC motor 300 is a synchronous motor such as a permanent magnet synchronous (PM) motor, for example. The AC motor 300, upon receiving the three-phase pseudo sinusoidal wave voltage from the inverter 200, rotates a rotor.

Current sensors 202 are provided on the power supply line from the inverter 200 to the AC motor 300. The current values detected by these current sensors 202 in real time (two-phase current value iu and iw of the three phases) are input to a three-phase/dq axis converter 204. The three-phase/dq axis converter 204 converts the current values iu and iw into the d-axis current value id and the q-axis current value iq for output.

Further, a resolver 302 is attached to the AC motor 300 for detecting a rotational position (rotation angle) $\theta e$ of the rotor. The resolver 302 detects the rotational position $\theta e$ of the rotor and outputs the rotational position $\theta e$ to a rotational frequency calculator 304. The rotational frequency calculator 304, using the rotational position $\theta e$ supplied from the resolver 302, calculates and outputs the rotational frequency (the rotational speed) we of the rotor of the AC motor 300.

An example structure of the overmodulation PWM controller 104 will be now described. The d-axis current value id and the q-axis current value iq from the three-phase/dq axis converter 204, as well as the d-axis current instruction id* and the q-axis current instruction iq* from the current instruction creator 110, are input to the current controller 20. The current controller 20 calculates and outputs a d-axis voltage instruction $vd_B$ and a q-axis voltage instruction $vq_B$ before compensation, such that the d-axis current value id and the q-axis current value iq approach the d-axis current instruction id* and the q-axis current instruction iq*, respectively (ideally, such that the d-axis current value id and the q-axis current value iq correspond to the d-axis current instruction id* and the q-axis current instruction iq*, respectively). The current controller 20 calculates the d-axis voltage instruction $vd_B$ and the q-axis voltage instruction $vq_B$ having voltage amplitudes and phases in accordance with the torque instruction T*, with the voltage amplitude exceeding the peak value of the triangular wave carrier. A voltage amplitude calculator 21, based on the d-axis voltage instruction $vd_B$ and a q-axis voltage instruction $vq_B$ before compensation from the current controller 20, calculates a voltage instruction amplitude before compensation, $E_B=(vd_B^2+vq_B^2)^{0.5}$ and the phase. A voltage amplitude linear compensation unit 22, upon receiving the d-axis voltage instruction $vd_B$ and a q-axis voltage instruction $vq_B$ from the current controller 20 and the voltage instruction amplitude $E_B$ from the voltage amplitude calculator 21, calculates and outputs a d-axis voltage instruction vd and a q-axis voltage instruction vq obtained by linear compensation of the d-axis voltage instruction $vd_B$ and a q-axis voltage instruction $vq_B$. The details of the linear compensation which is performed here will be described below. A dq axis/three-phase converter 24, using the rotational position θe supplied from the resolver 302 as a reference, converts the d-axis voltage instruction vd and the q-axis voltage instruction vq after linear compensation supplied from the voltage amplitude linear compensation unit 22 into three-phase (u-phase, v-phase, and w-phase) voltage instructions vu, vv, and vw and outputs the voltage instructions vu, vv, and vw to a PWM generator 26. The PWM generator 26 compares the three-phase voltage instructions vu, vv, and vw with the triangular wave carrier to generate and output switching instructions having a pulse width corresponding to the amplitudes of the three-phase voltage instructions vu, vv, and vw. Here, the three-phase voltage instructions vu, vv, and vw to be compared with the triangular wave carrier are updated in a predetermined cycle (e.g. a cycle which is synchronized with the triangular wave carrier). A synchronous PWM controller 28, based on the rotational frequency (the rotational speed) ωe of the AC motor 300 calculated by the rotational frequency calculator 304, determines the frequency fc of the triangular wave carrier and the number K of the triangular wave carriers per one cycle of the phase voltage instruction (triangular wave carrier frequency fc/phase voltage instruction frequency fm, which will be referred to as the synchronization number), to thereby control the phase of the three-phase voltage instructions vu, vv, and vw and the triangular wave carrier. The details of the phase control performed here will be described below. Here, the processing by the voltage amplitude calculator 21, the voltage amplitude linear compensation unit 22, the dq axis/three-phase converter 24, the PWM generator 26, and the synchronous PWM controller 28 can be performed in synchronization with the triangular wave carrier cycle, for example. On the other hand, the processing by the current instruction creator 110, the current controller 20, and the three-phase/dq axis converter 204 can be performed in a fixed cycle, for example, and need not necessarily be performed in synchronization with the triangular wave carrier.

Here, because the sinusoidal wave PWM controller 102 and the rectangular wave voltage controller 106 can be implemented by using a known technology, the details of the specific structures thereof will not be described. For example, the sinusoidal wave PWM controller 102 can have a structure in which the voltage amplitude linear compensation unit 22 and the voltage amplitude characteristic storage unit 29 are omitted from the example structure of the overmodulation PWM controller 104 illustrated in FIG. 2.

In the overmodulation PWM control in which the amplitude of the phase voltage instruction (three-phase voltage instructions vu, vv, vw) exceeds the peak value of the triangular wave carrier, the amplitude of the fundamental wave component of the pulse width modulation voltage output from the inverter 200 does not increase linearly with respect to the linear increase in the amplitude of the three-phase voltage instructions vu, vv, and vw, and the amplitude of the fundamental wave component of the pulse width modulation voltage is smaller than the amplitude of the three-phase voltage instructions vu, vv, and vw. Accordingly, the voltage amplitude linear compensation unit 22 corrects the d-axis voltage instruction $vd_B$ and a q-axis voltage instruction $vq_B$ to thereby correct the voltage instruction amplitude $E_B$, such that the fundamental wave amplitude of the output voltage (pulse width modulation voltage) of the inverter 200 corresponds to the voltage instruction amplitude $E_B$ calculated by the voltage amplitude calculator 21. Here, a voltage amplitude characteristic map representing a relationship between the voltage instruction amplitude and the fundamental wave amplitude of the pulse width modulation voltage is prestored in the voltage amplitude characteristic storage unit 29. Then, the voltage amplitude linear compensation unit 22, using the voltage amplitude characteristic map read from the voltage amplitude characteristic storage unit 29, calculates a voltage instruction amplitude which is necessary for making the fundamental wave amplitude of the pulse width modulation voltage conform to the voltage instruction amplitude $E_B$, and, based on the voltage instruction amplitude thus calculated, calculates the d-axis voltage instruction vd and the q-axis voltage instruction vq after correction. In this manner, the d-axis voltage instruction $vd_B$ and the q-axis voltage instruction $vq_B$ can be linearly compensated, so that the fundamental wave amplitude of the pulse width modulation voltage can be linearly increased with respect to the linear increase in the voltage instruction amplitude $E_B$.

Figure 5:
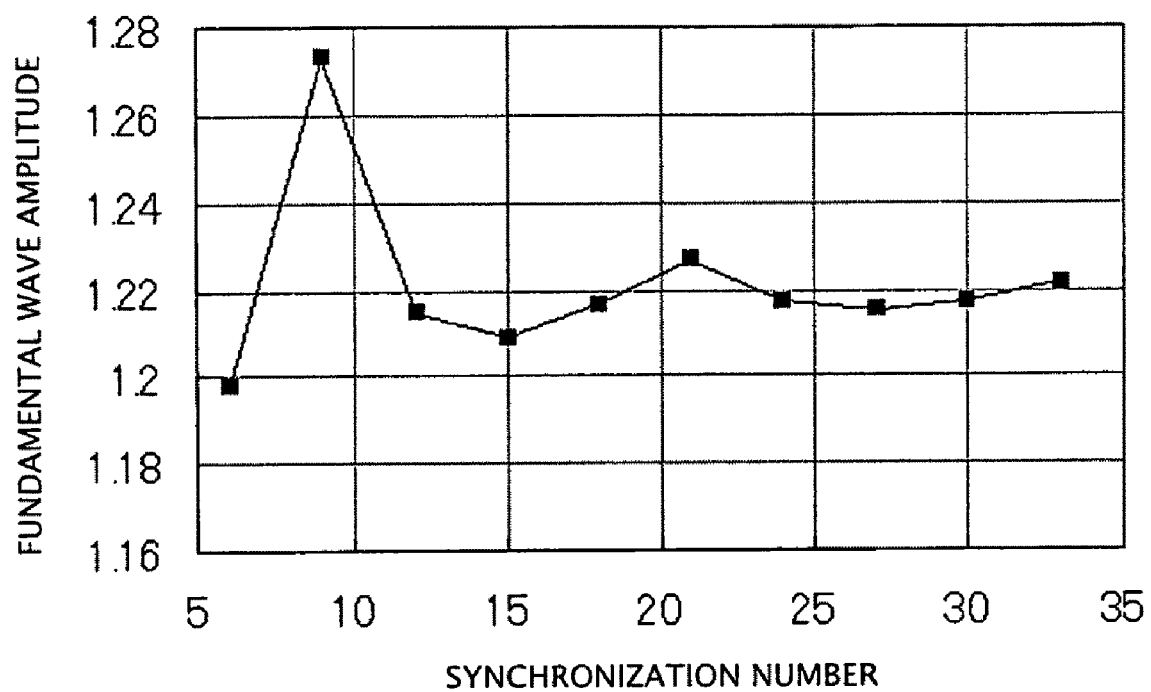
FIG. 5 is a chart illustrating an examination result of the fundamental wave amplitude of a pulse width modulation voltage obtained by changing the synchronization number while the voltage instruction amplitude is fixed.
Figure 7:
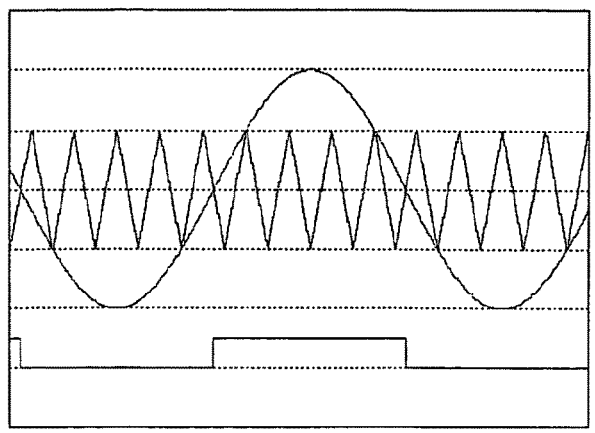
FIG. 7 is a chart illustrating examples of the phases of a phase voltage instruction and a triangular wave carrier.
Figure 7:
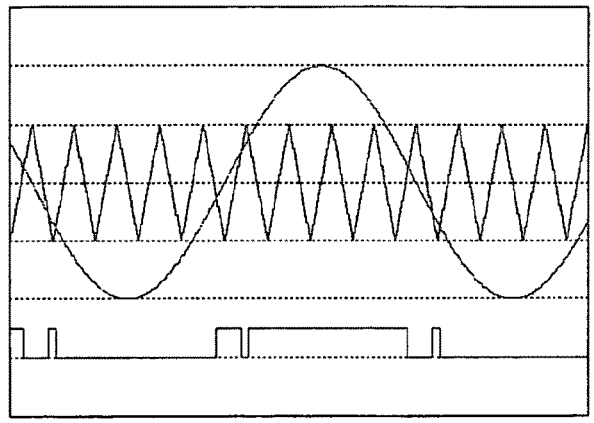
Figure 7:
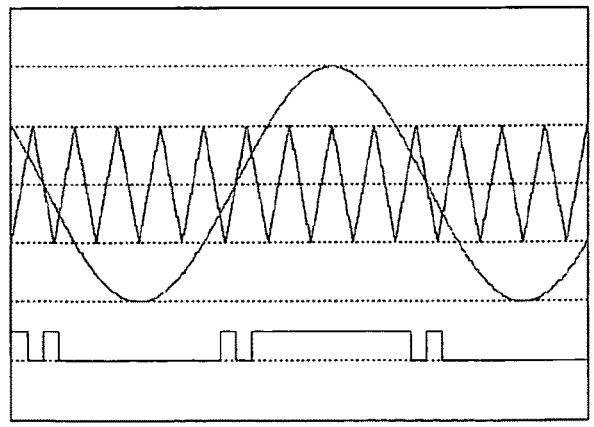

However, when the synchronization number (the number of triangular wave carriers per one cycle of the phase voltage instruction) K changes, the fundamental wave amplitude of the output voltage (pulse width modulation voltage) of the inverter 200 changes, even if the voltage instruction amplitude remains unchanged. Here, FIG. 5 illustrates a result of examination of the fundamental wave amplitude of the pulse width modulation voltage obtained when the synchronization number K is changed in a state in which the voltage instruction amplitude is fixed. In the result illustrated in FIG. 5, a relative phase of the phase voltage instruction and the triangular wave carrier is determined such that a zero cross point from positive to negative of the phase voltage instruction and an intermediate point of transition from the valley to peak of the triangular wave carrier are in synchronism with each other (a state illustrated in FIG. 7(a), for example), and the voltage instruction amplitude is made twice the amplitude of the triangular wave carrier and the update timing of the phase voltage instruction with respect to the triangular wave carrier is made continuous. As illustrated in FIG. 5, even when the voltage instruction amplitude is fixed, the fundamental wave amplitude of the pulse width modulation voltage changes with respect to a change of the synchronization number K.

Figure 6:
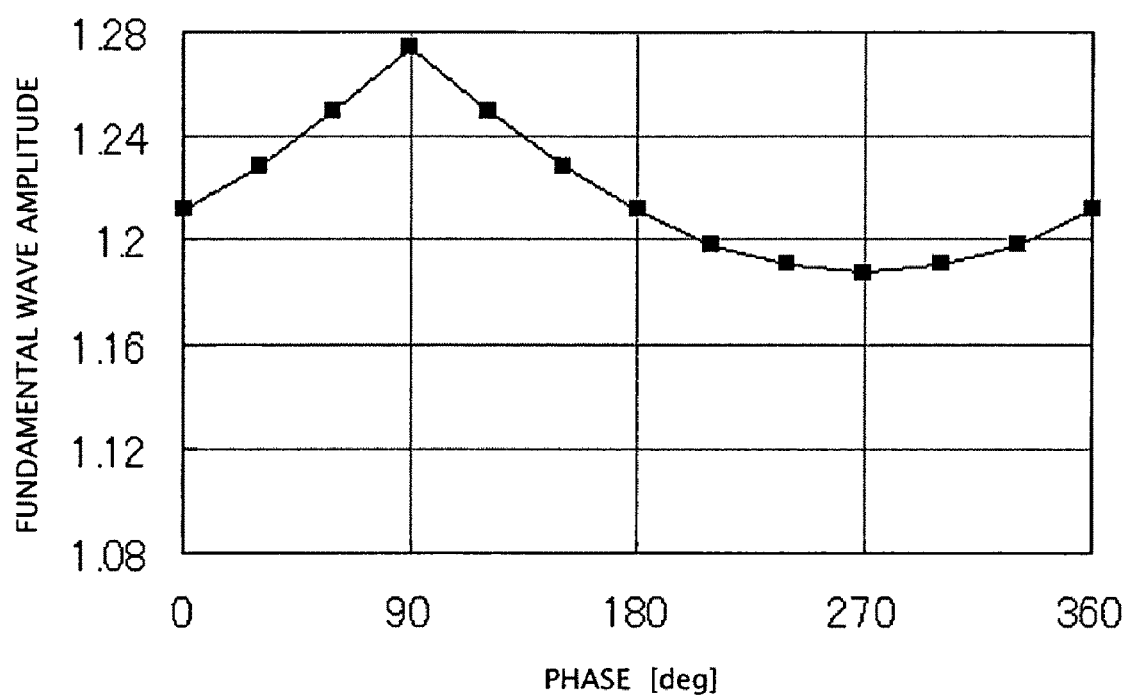
FIG. 6 is a chart illustrating an examination result of the fundamental wave amplitude of a pulse width modulation voltage obtained by changing the phase of a phase voltage instruction and a triangular wave carrier while the voltage instruction amplitude is fixed.

Further, even when the voltage instruction amplitude remains unchanged, the fundamental wave amplitude of the pulse width modulation voltage also changes when a relative phase of the phase voltage instruction and the triangular wave carrier changes. Here, FIG. 6 illustrates a result of examination of the fundamental wave amplitude of the pulse width modulation voltage obtained when the relative phase of the phase voltage instruction and the triangular wave carrier is changed in a state in which the voltage instruction amplitude is fixed. In the result illustrated in FIG. 6, the synchronization number K is 9, the voltage instruction amplitude is twice the amplitude of the triangular wave carrier, and the update timing of the phase voltage instruction is continuous. Further, in FIG. 6, the phase 90° represents a state in which a zero cross point from positive to negative of the phase voltage instruction and an intermediate point of transition from the valley to peak of the triangular wave carrier are in synchronism with each other (a state illustrated in FIG. 7(a) in which the phase of the phase voltage instruction and the triangular wave carrier is 90°, for example), the phase 180° represents a state in which a zero cross point from positive to negative of the phase voltage instruction and a peak (an apex) of the triangular wave carrier are in synchronism with each other (a state illustrated in FIG. 7(b) in which the phase of the phase voltage instruction and the triangular wave carrier is 180°, for example), and the phase 270° represents a state in which a zero cross point from positive to negative of the phase voltage instruction and an intermediate point of transition from the peak to valley of the triangular wave carrier are in synchronism with each other (a state illustrated in FIG. 7(c) in which the phase of the phase voltage instruction and the triangular wave carrier is 270°, for example). As illustrated in FIG. 6, even when the voltage instruction amplitude is fixed, the fundamental wave amplitude of the pulse width modulation voltage changes with respect to a change in the relative phase of the phase voltage instruction and the triangular wave carrier.

Figure 8:
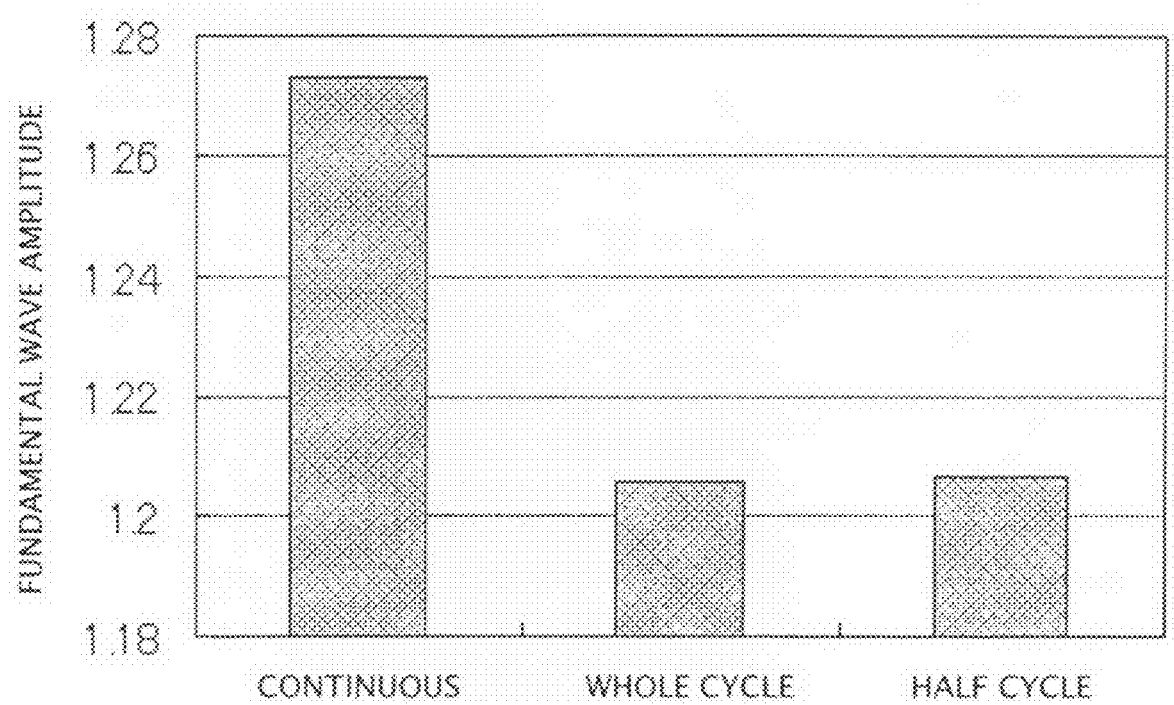
FIG. 8 is a chart illustrating an examination result of the fundamental wave amplitude of a pulse width modulation voltage obtained by changing the update timing of the phase voltage instruction while the voltage instruction amplitude is fixed.

In addition, even when the voltage instruction amplitude remains unchanged, the fundamental wave amplitude of the pulse width modulation voltage also changes when the update timing of the phase voltage instruction changes. Here, FIG. 8 illustrates a result of examination of the fundamental wave amplitude of the pulse width modulation voltage obtained when the update timing of the phase voltage instruction with respect to the triangular wave carrier is changed in a state in which the voltage instruction amplitude is fixed. In the result illustrated in FIG. 8, the synchronization number K is 9, the voltage instruction amplitude is twice the amplitude of the triangular wave carrier, and the relative phase of the phase voltage instruction and the triangular wave carrier is determined such that a zero cross point from positive to negative of the phase voltage instruction and an intermediate point of transition from the valley to peak of the triangular wave carrier are in synchronism with each other (the state illustrated in FIG. 7(a), for example). Further, in FIG. 8, "continuous" represents a case in which the phase voltage instruction is updated continuously (in an analog manner), "whole cycle" represents a case in which the phase voltage instruction is updated for each cycle of the triangular wave carrier (for each valley of the triangular wave carrier), and "half cycle" represents a case in which the phase voltage instruction is updated for every half cycle of the triangular wave carrier (for each of the peak and the valley of the triangular wave carrier). As illustrated in FIG. 8, even when the voltage instruction amplitude is fixed, the fundamental wave amplitude of the pulse width modulation voltage changes with respect to a change of the update timing of the phase voltage instruction.

As described above, even when the voltage instruction amplitude remains unchanged, the fundamental wave amplitude of the output voltage (pulse width modulation voltage) of the inverter 200 changes in accordance with a change of at least one of the synchronization number K, the relative phase of the phase voltage instruction and the triangular wave carrier, and the update timing of the phase voltage instruction. Such a change of the fundamental wave amplitude makes it impossible to obtain the fundamental wave amplitude corresponding to the voltage instruction amplitude, which results in a reduction in controllability of the overmodulation PWM control.

Accordingly, in the present embodiment, the voltage amplitude linear compensation unit 22 corrects the d-axis voltage instruction $vd_B$ and the q-axis voltage instruction $vq_B$ in accordance with the synchronization number K supplied from the synchronous PWM controller 28 to correct the voltage instruction amplitude $E_B$. Here, the voltage amplitude characteristic storage unit 29 stores, in association with the synchronization number K, a plurality of voltage amplitude characteristic maps having different relationships between the voltage instruction amplitude and the fundamental wave amplitude of the pulse width modulation voltage in accordance with different synchronization numbers K. Then, the voltage amplitude linear compensation unit 22 reads out the voltage amplitude characteristic map corresponding to the synchronization number K from the voltage amplitude characteristic storage unit 29, and uses the thus-read voltage amplitude characteristic map to correct the d-axis voltage instruction $vd_B$ and the q-axis voltage instruction $vq_B$ (the voltage instruction amplitude $E_B$).

Figure 9:
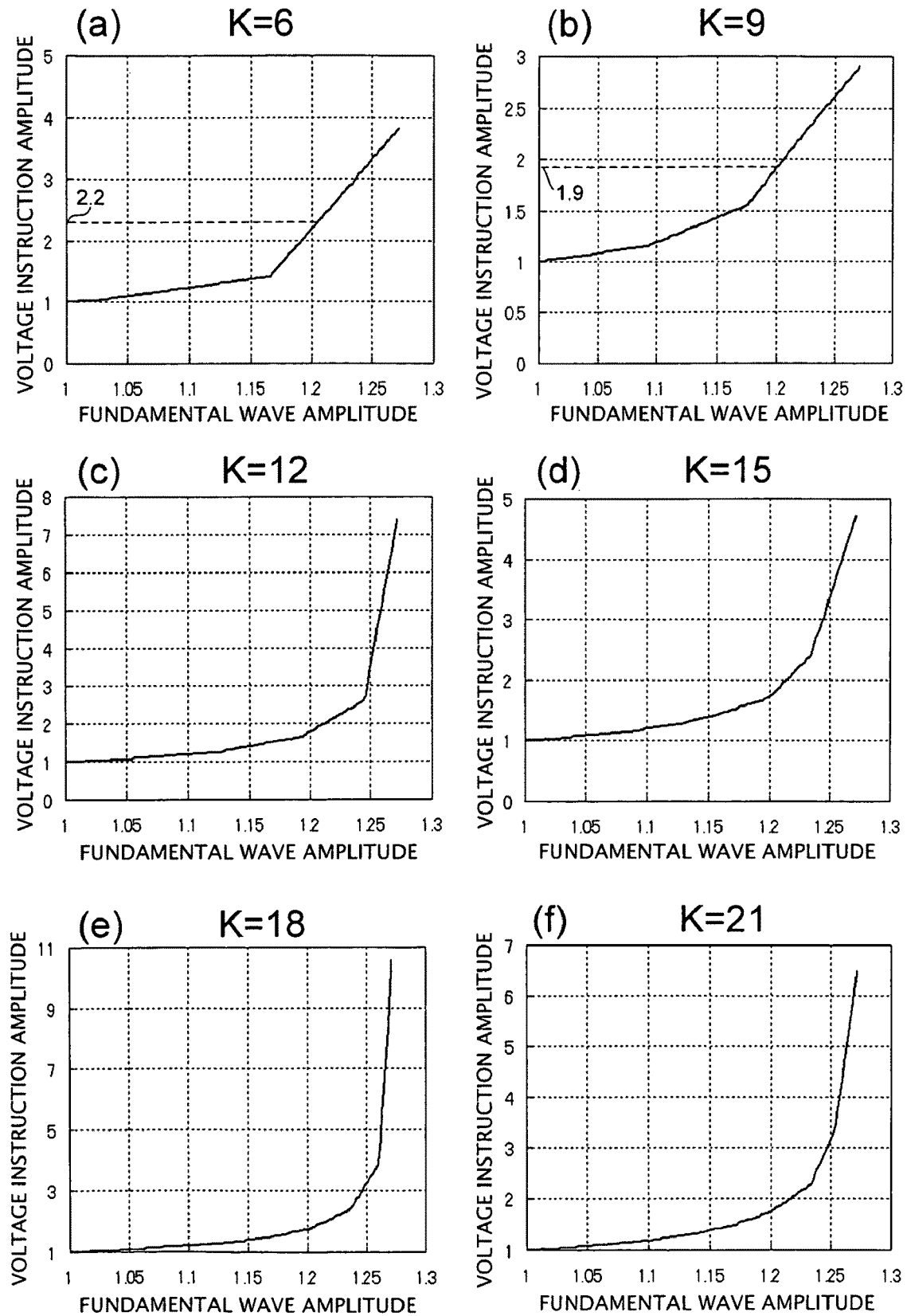
FIG. 9 shows example voltage-amplitude characteristic maps representing a relationship between the voltage instruction amplitude and the fundamental wave amplitude of a pulse width modulation voltage.
Figure 10:
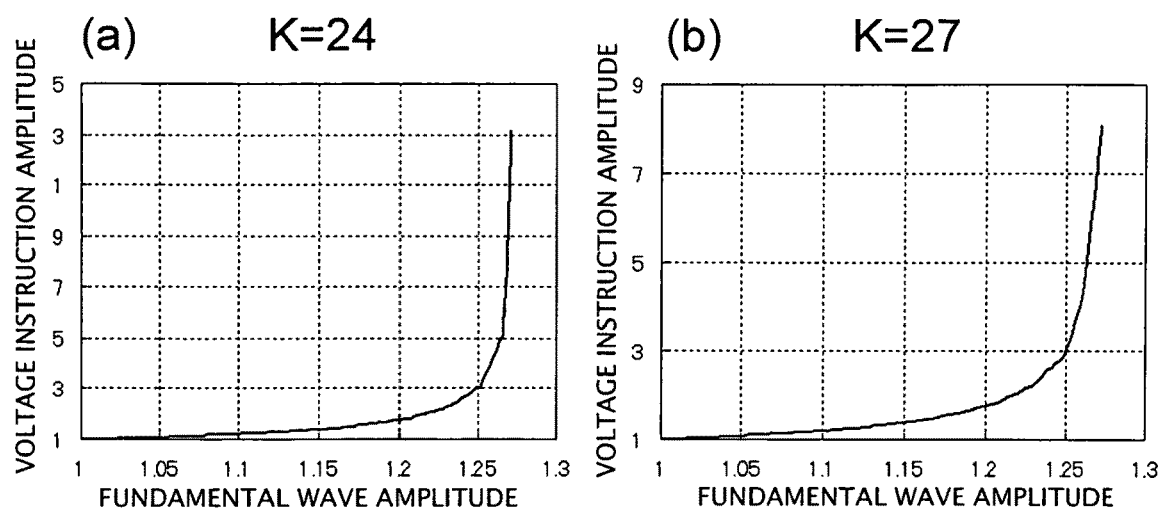
FIG. 10 shows further example voltage-amplitude characteristic maps representing a relationship between the voltage instruction amplitude and the fundamental wave amplitude of a pulse width modulation voltage.

FIGS. 9 and 10 illustrate examples of these voltage amplitude characteristic maps. Specifically, FIG. 9(a) is a voltage amplitude characteristic map corresponding to the synchronization number K=6; FIG. 9(b) is a voltage amplitude characteristic map corresponding to the synchronization number K=9; FIG. 9(c) is a voltage amplitude characteristic map corresponding to the synchronization number K=12; FIG. 9(d) is a voltage amplitude characteristic map corresponding to the synchronization number K=15; FIG. 9(e) is a voltage amplitude characteristic map corresponding to the synchronization number K=18; and FIG. 9(f) is a voltage amplitude characteristic map corresponding to the synchronization number K=21. Further, FIG. 10(a) is a voltage amplitude characteristic map corresponding to the synchronization number K=24, and FIG. 10(b) is a voltage amplitude characteristic map corresponding to the synchronization number K=27. Here, in the voltage amplitude characteristic maps illustrated in FIGS. 9 and 10, the values of the fundamental wave amplitude and the voltage instruction amplitude are values obtained by dividing the fundamental wave amplitude and the voltage instruction amplitude by the amplitude of the triangular wave carrier. For example, in the case of the synchronization number K=6 and the voltage instruction amplitude $E_B$=1.2 (1.2 times the triangular wave carrier amplitude), in order to make the fundamental wave of the pulse width modulation voltage 1.2 (1.2 times the triangular wave carrier amplitude), the value of the voltage instruction amplitude is corrected to 2.2 (2.2 times the triangular wave carrier amplitude) by using the voltage amplitude characteristic map illustrated in FIG. 9(a). On the other hand, in the case of the synchronization number K=9 and the voltage instruction amplitude $E_B$=1.2 (1.2 times the triangular wave carrier amplitude), in order to make the fundamental wave of the pulse width modulation voltage 1.2 (1.2 times the triangular wave carrier amplitude), the value of the voltage instruction amplitude is corrected to 1.9 (1.9 times the triangular wave carrier amplitude) by using the voltage amplitude characteristic map illustrated in FIG. 9(b). Thus, by correcting the voltage instruction amplitude by using a different voltage amplitude characteristic map in accordance with the synchronization number K, it is possible to suppress a change of the fundamental wave amplitude of the pulse width modulation voltage caused by the change of the synchronization number K.

Here, the conditions of the relative phase of the phase voltage instruction and the triangular wave carrier at the time of creating the voltage amplitude characteristic maps illustrated in FIGS. 9 and 10 are that the zero cross point of the phase voltage instruction from positive to negative is in synchronization with the intermediate point of transition from the valley to peak of the triangular wave carrier (the condition illustrated in FIG. 11, for example) when the synchronization number K is an odd number, and that the zero cross point of the phase voltage instruction is in synchronization with the peak of the triangular wave carrier (the condition illustrated in FIG. 12, for example) when the synchronization number K is an even number. Accordingly, the synchronization PWM controller 28 controls the relative phase of the phase voltage instruction and the triangular wave carrier to make the zero cross point of the phase voltage instruction from positive to negative synchronized with the intermediate point of transition from the valley to the peak of the triangular wave carrier when the synchronization number K is an odd number, and controls the relative phase of the phase voltage instruction and the triangular wave carrier to make the zero cross point of the phase voltage instruction synchronized with the peak of the triangular wave carrier when the synchronization number K is an even number. Thus, when the voltage instruction amplitude is corrected by using the voltage amplitude characteristic map in accordance with the synchronization number K, the synchronization PWM controller 28 controls the relative phase of the phase voltage instruction and the triangular wave carrier to conform to the phase at the time of creation of the corresponding voltage amplitude characteristic map. Consequently, the conditions of the relative phase of the phase voltage instruction and the triangular wave carrier are the same for a given same synchronization number, so that a change of the fundamental wave amplitude of the pulse width modulation voltage with the change of the relative phase of the phase voltage instruction and the triangular wave carrier can be suppressed. Here, because the technology of controlling the phases of the phase voltage instruction and the triangular wave carrier itself is well known, detailed description thereof will be omitted (see JP 2607488 B and JP 2001845 B, for example). Further, the conditions of the update timing of the phase voltage instruction at the time of creating the voltage amplitude characteristic maps illustrated in FIGS. 9 and 10 are that the update timing of the phase voltage instruction is the peak and the valley of the triangular wave carrier (a half cycle of the triangular wave carrier).

Figure 11:
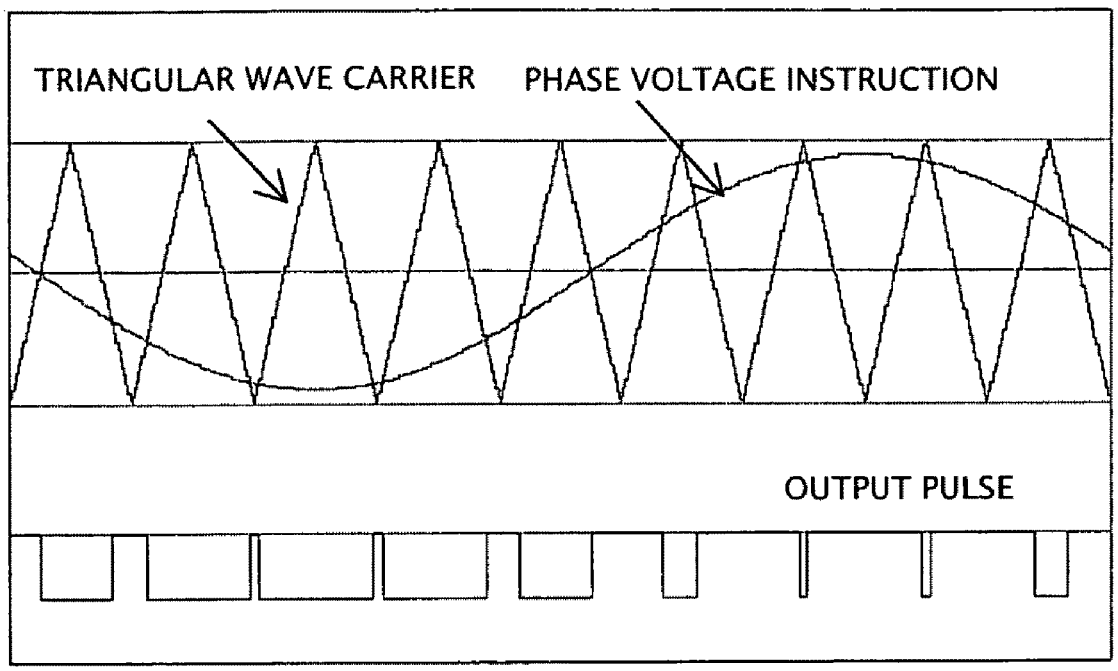
FIG. 11 is a chart illustrating an example of the phase of a phase voltage instruction and a triangular wave carrier when the synchronization number is an odd number.

As illustrated in FIG. 11, when the zero cross point of the phase voltage instruction from positive to negative is synchronized with the intermediate point of transition from the valley to peak of the triangular wave carrier in the case of the synchronization number K being an odd number, the comparison result of the phase voltage instruction and the triangular wave carrier (the output pulse) has identical shapes in the positive region and the negative region of the phase voltage instruction, which is symmetrical about the maximum value (the minimum value) of the phase voltage instruction. Then, at the maximum value of the phase voltage instruction, a switching element on the upper side of the inverter arm is placed in an ON state. Under this condition, the fundamental wave amplitude of the pulse width modulation voltage can be controlled from the fundamental wave amplitude maximum value in the sinusoidal wave PWM control to the fundamental wave amplitude value in the rectangular wave voltage control.

Figure 12:
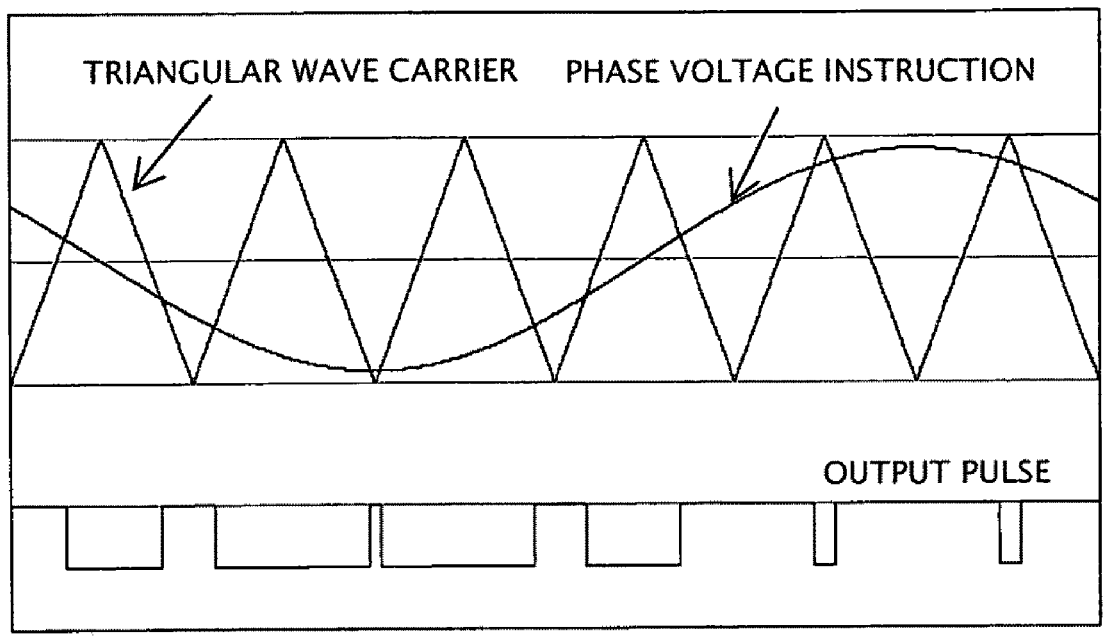
FIG. 12 is a chart illustrating an example of the phase of a phase voltage instruction and a triangular wave carrier when the synchronization number is an even number.
Figure 13:
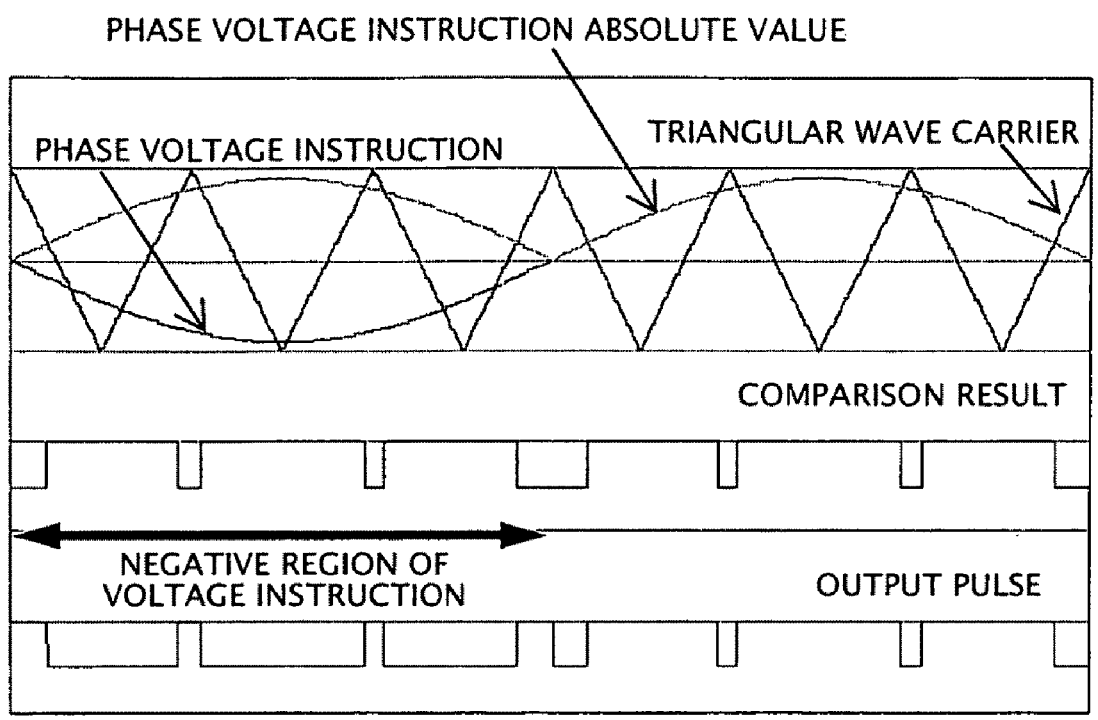
FIG. 13 is a chart illustrating an example of the ideal phase of a phase voltage instruction and a triangular wave carrier when the synchronization number is an even number.

When the synchronization number K is an even number, on the other hand, preferably, the zero cross point of an absolute value of the phase voltage instruction is synchronized with the peak of the triangular wave carrier and the comparison results between the absolute value of the phase voltage instruction and the triangular wave carrier are inverted in the negative region of the phase voltage instruction (which is a region indicated by an arrow in FIG. 13), thereby generating the output pulses, as illustrated in FIG. 13. However, when the overmodulation PWM controller 104 is configured by a microcomputer, it is difficult to instantaneously switch between inversion and non-inversion of the comparison results. Accordingly, in the present embodiment, when the synchronization number K is an even number, the zero cross point of the phase voltage instruction is synchronized with the peak of the triangular wave carrier (the relative phase of the phase voltage instruction and the triangular wave carrier is controlled to be 180°, as illustrated in FIG. 12.

Figure 14:
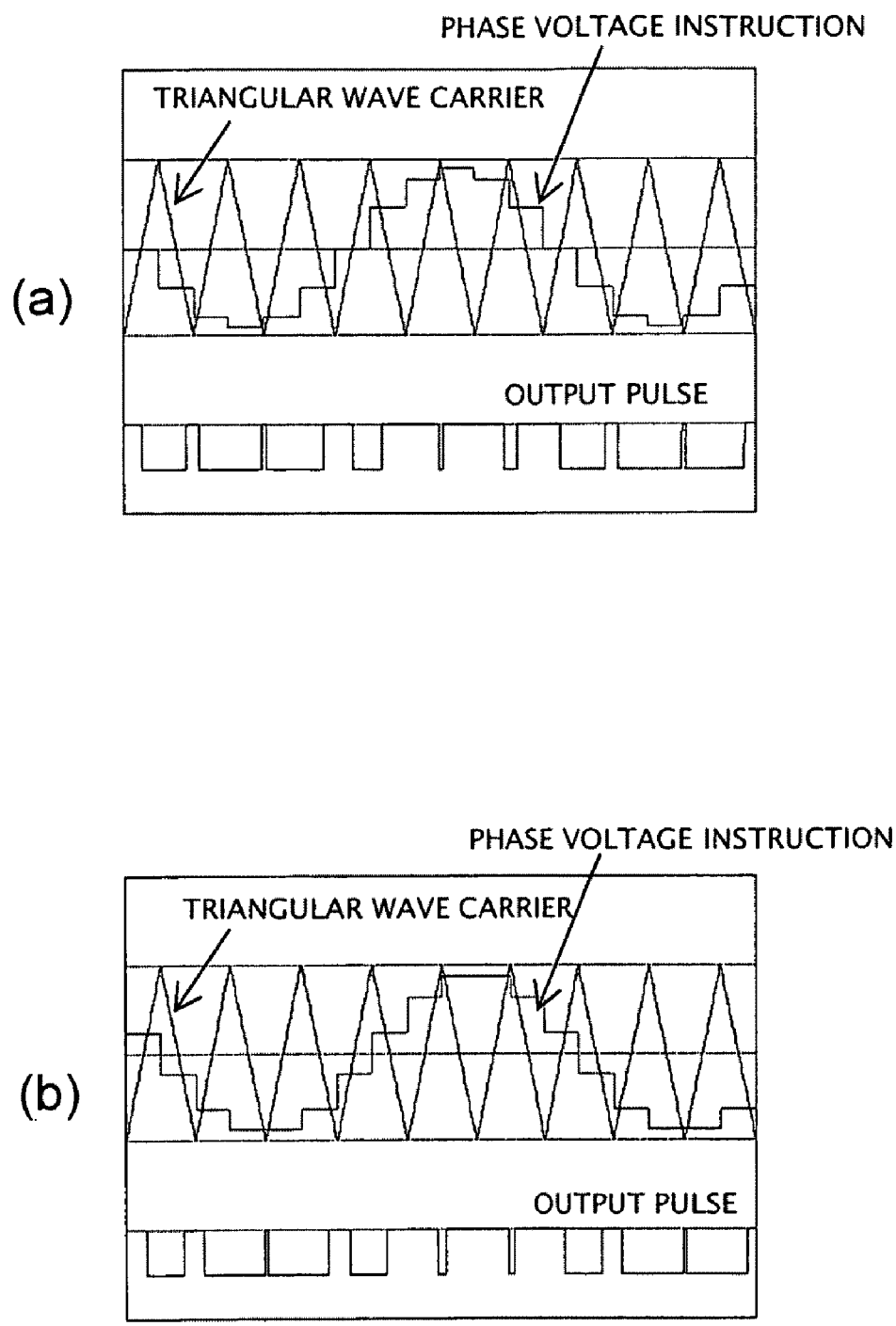
FIG. 14 is a view illustrating examples of the phase of the phase voltage instruction and the triangular wave carrier.

For example, as illustrated in FIG. 14($a$), when the relative phase of the phase voltage instruction and the triangular wave carrier is controlled to be 90° in the case of the synchronization number K being an even number, the phase voltage instruction and the triangular wave carrier cross each other without fail when the value of the phase voltage instruction is 0, and consequently there are cases in which the comparison result (output pulse) between the phase voltage instruction and the triangular wave carrier does not result in one pulse per one cycle of the phase voltage instruction even if the voltage instruction amplitude is increased. On the other hand, by controlling the relative phase of the phase voltage instruction and the triangular wave carrier to be 180° as illustrated in FIG. 14($b$), it is possible to obtain the comparison result (output pulse) between the phase voltage instruction and the triangular wave carrier such that one pulse is generated per one cycle of the phase voltage instruction when the voltage instruction amplitude is increased. As a result, it is possible to control the fundamental wave amplitude of the pulse width modulation voltage from the maximum value of the fundamental wave amplitude in the sinusoidal wave PWM control to the fundamental wave amplitude value in the rectangular wave voltage control. Here, FIGS. 14($a$) and 14($b$) illustrate examples in which the synchronization number K is 6 and the update timing of the phase voltage instruction is the peak and the valley of the triangular wave carrier (a half cycle of the triangular wave carrier).

Figure 15:
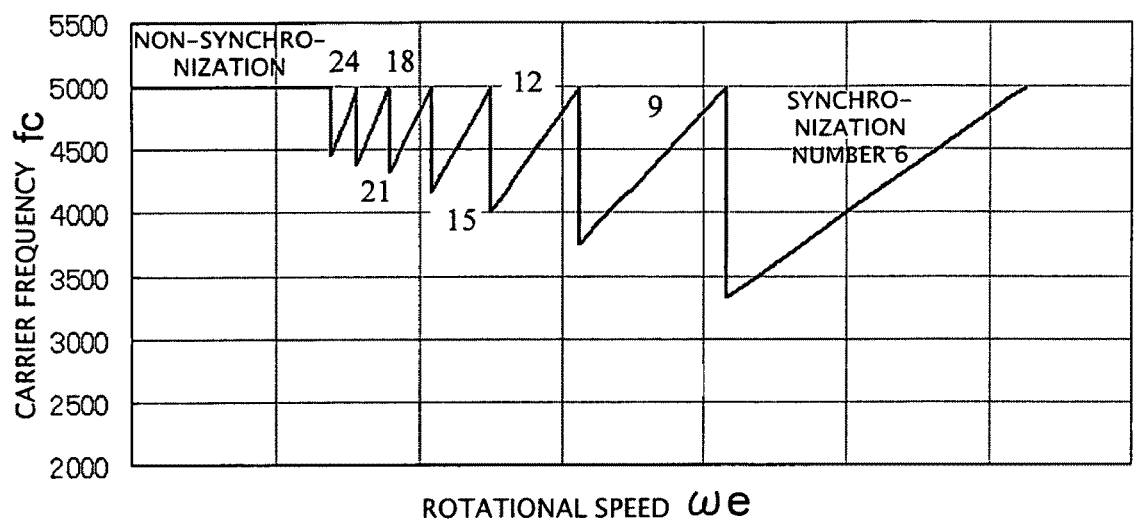
FIG. 15 is a graph illustrating an example of a relationship between the triangular wave carrier frequency and the synchronization number with respect to the rotational speed of an AC motor.
Figure 16:
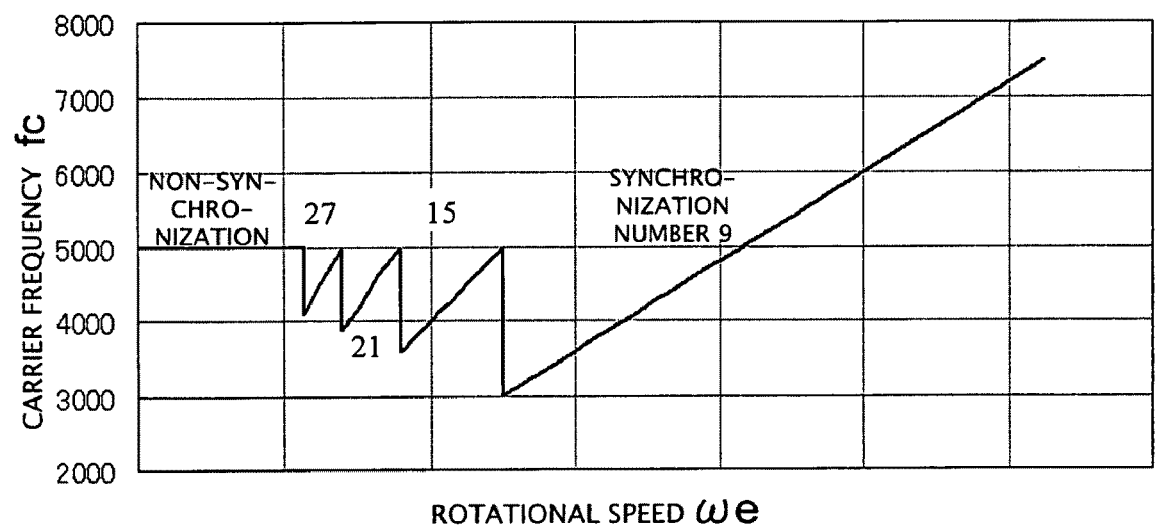
FIG. 16 is a graph illustrating an example of a relationship between the triangular wave carrier frequency and the synchronization number with respect to the rotational speed of an AC motor.
Figure 17:
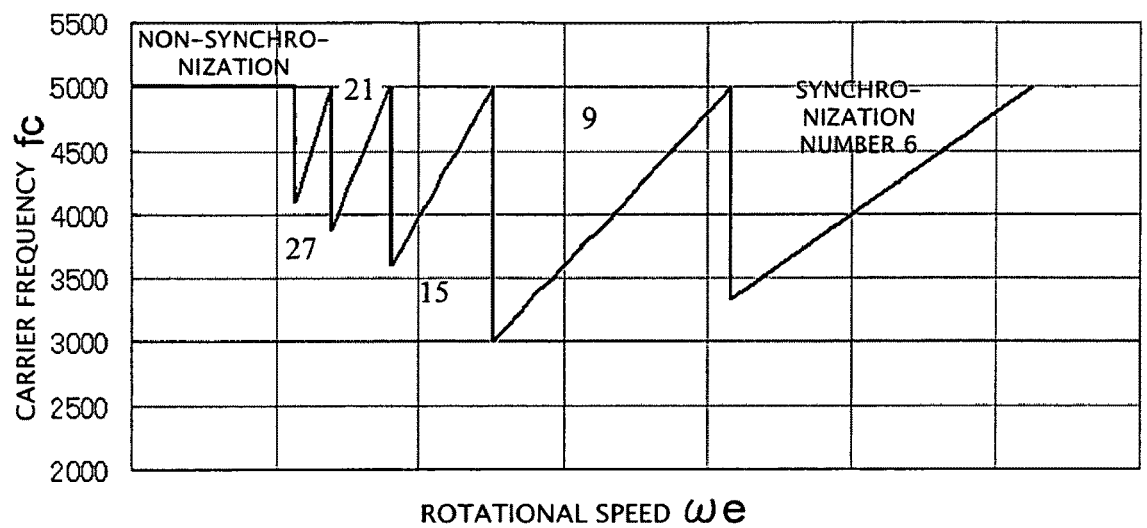
FIG. 17 is a graph illustrating an example of a relationship between the triangular wave carrier frequency and the synchronization number with respect to the rotational speed of an AC motor.

FIGS. 15 to 17 illustrate example relationships of the triangular wave carrier frequency fc and the synchronization number K with respect to the rotational speed we of the AC motor 300. Here, it is preferable to make the frequency of the triangular wave carrier fc and the frequency of the phase voltage instruction fm multiples of 3 so as to avoid the beat phenomenon. Specifically, FIG. 15 illustrates an example in which multiples of 3 (including both odd numbers and even numbers) are used as the synchronization number K (fc/fm), FIG. 16 illustrates an example in which only multiples of 3 which are odd numbers are used as the synchronization number K, and FIG. 17 illustrates an example in which multiples of 3 which are odd numbers and 6 are used as the synchronization number K. In the examples illustrated in FIGS. 15 to 17, the synchronization number K is decreased with an increase of the rotational speed we of the AC motor 300. Within the range of the rotational speed we in which the synchronization number K remains unchanged, the triangular wave carrier frequency f increases with the rotational speed ωe. Further, while the amount of change of the triangular wave carrier frequency fc is increased when only the multiples of 3 which are odd numbers are used as the synchronization number K as illustrated in FIG. 16, the amount of change of the triangular wave carrier frequency fc can be decreased by using multiples of 3 which are odd numbers and those that are even numbers as the synchronization numbers K as illustrated in FIGS. 15 and 17.

According to the present embodiment described above, in the overmodulation PWM control, by correcting the voltage instruction amplitude by using a different voltage amplitude characteristic map in accordance with the synchronization number K, it is possible to suppress a change of the fundamental wave amplitude of the pulse width modulation voltage to be applied to the AC motor 300 caused by a change of the synchronization number K. Accordingly, in the overmodulation PWM control, even when the number of triangular wave carriers per one cycle of the phase voltage instruction is small (when the synchronization number K is small), it is possible to stably control the fundamental wave amplitude of the pulse width modulation voltage to conform to the voltage instruction amplitude. As a result, controllability of the overmodulation PWM control can be increased, and in particular, controllability can be increased in the high voltage region in which the number of triangular wave carriers per one cycle of the phase voltage instruction is small and is close to that of a rectangular wave (one pulse per one cycle of the phase voltage instruction).

In the description of the embodiment described above, when the synchronization number K is an odd number, a voltage amplitude characteristic map is created under conditions that the zero cross point of the phase voltage instruction from positive to negative is synchronized with the intermediate point of transition from the valley to peak of the triangular wave carrier, to thereby control the relative phase between the phase voltage instruction and the triangular wave carrier, and when the synchronization number K is an even number, a voltage amplitude characteristic map is created under conditions that the zero cross point of the phase voltage instruction is synchronized with the peak of the triangular wave carrier, to thereby control the relative phase between the phase voltage instruction and the triangular wave carrier. However, in the present embodiment, the relative phase of the phase voltage instruction and the triangular wave carrier can be set as desired. In order to change the relative phase of the phase voltage instruction and the triangular wave carrier, a voltage amplitude characteristic map in accordance with the phase is newly created. Similarly, the update timing of the phase voltage instruction can also be set as desired. In order to change the update timing of the phase voltage instruction and the triangular wave carrier, a voltage amplitude characteristic map in accordance with the update timing is newly created.

Further, in the present embodiment, when the update timing of the phase voltage instruction with respect to the triangular wave carrier is changed, the voltage amplitude linear compensation unit 22 can also correct the d-axis voltage instruction $vd_B$ and the q-axis voltage instruction $vq_B$ in accordance with the update timing of the phase voltage instruction to thereby correct the voltage instruction amplitude $E_B$. In this case, the voltage amplitude characteristic storage unit 29 stores, in association with the update timing of the phase voltage instruction, a plurality of voltage amplitude characteristic maps in which the relationship between the voltage instruction amplitude and the fundamental wave amplitude of the pulse width modulation voltage varies depending on the update timing of the phase voltage instruction. For example, the voltage amplitude characteristic storage unit 29 is capable of storing a voltage amplitude characteristic map corresponding to a case in which the phase voltage instruction is updated for each half cycle of the triangular wave carrier (for each peak and valley of the triangular wave carrier, for example) and a voltage amplitude characteristic map corresponding to a case in which the phase voltage instruction is updated for each whole cycle of the triangular wave carrier (for each peak or each valley of the triangular wave carrier, for example). The voltage amplitude characteristic storage unit 29 is capable of further storing a voltage amplitude characteristic map corresponding to a case in which the phase voltage instruction is updated substantially continuously for each cycle which is sufficiently shorter than the triangular wave carrier. The voltage amplitude linear compensation unit 22 then reads from the voltage amplitude characteristic storage unit 29 a different voltage amplitude characteristic map in accordance with the update timing of the phase voltage instruction, and uses the thus-read voltage amplitude characteristic map to correct the d-axis voltage instruction $vd_B$ and the q-axis voltage instruction $vq_B$ (voltage instruction amplitude $E_B$). Thus, in the overmodulation PWM control, a change of the fundamental wave amplitude of the pulse width modulation voltage caused by a change of the update timing of the phase voltage instruction can be suppressed. Consequently, in the overmodulation PWM control, it is possible to stably control the fundamental wave amplitude of the pulse width modulation voltage to conform to the voltage instruction amplitude.

A preferred example of a case in which the control mode decision unit 108 selectively switches the control mode for the AC motor 300 will be now described.

Figure 18:
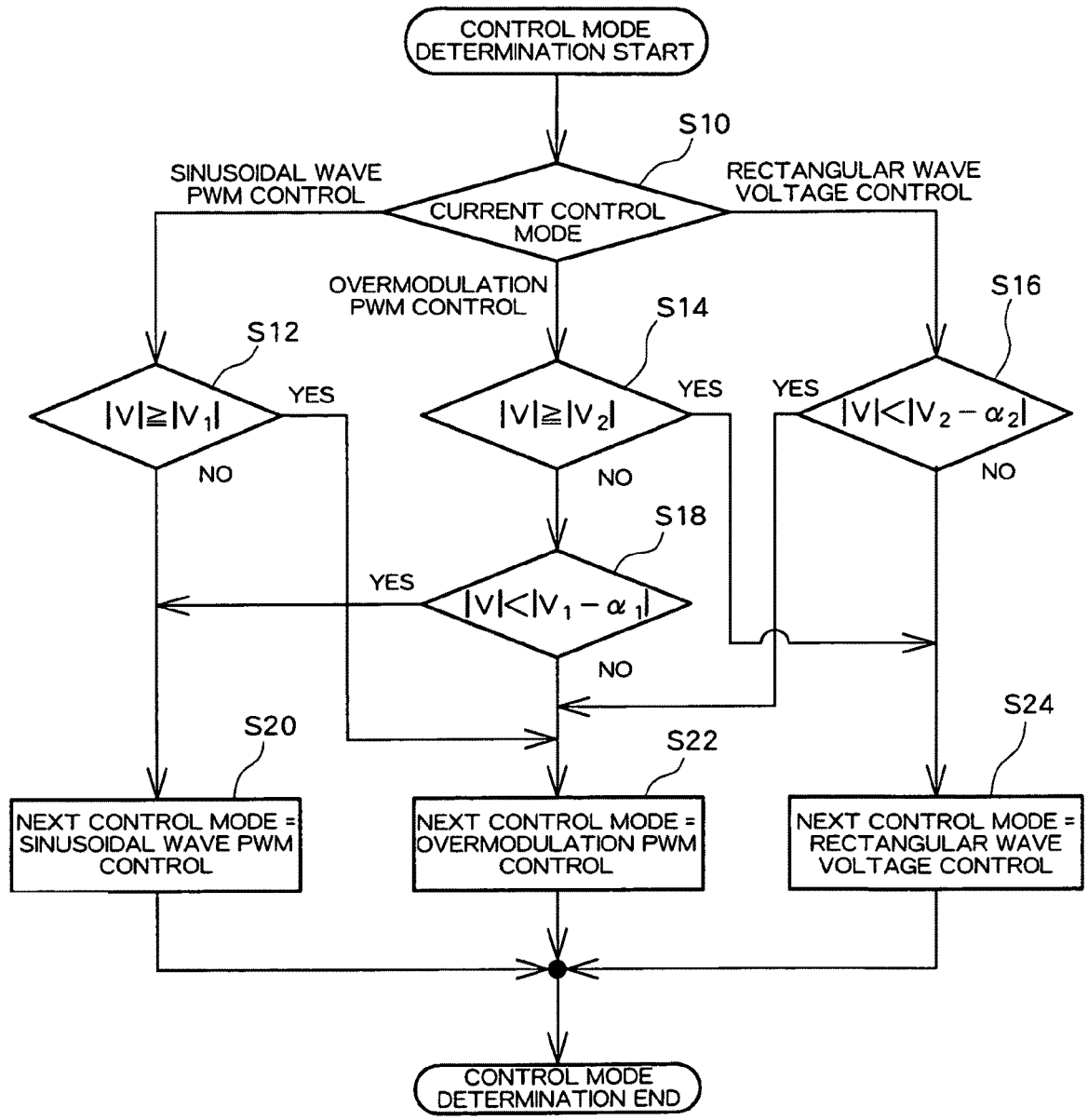
FIG. 18 is a flowchart for explaining example processing for selectively switching the control mode of an AC motor.

The control mode decision unit 108 is capable of switching the control mode of the drive controller 100 in accordance with the flowchart illustrated in FIG. 18, for example. Once the control is started, the current control mode is determined in step S10. When the sinusoidal wave PWM controller 102 is selected, processing proceeds to step S12, and when the overmodulation PWM controller 104 is selected, processing proceeds to step S14. Further, when the rectangular wave voltage controller 106 is selected, processing proceeds to step S16.

In step S12, determination for switching the control mode is performed in accordance with an absolute value $|V_R|$ of a required voltage amplitude, using an absolute value $|Vc_P|$ of the peak value of the triangular wave carrier voltage as a reference. The required voltage amplitude $V_R$ can be calculated based on the following formula:

[Formula 2]

Required voltage amplitude $V_R$=power $P$/(current amplitude $|I|$×power factor $\phi$) (2)

Here, the absolute value of current amplitude $|I|$ can be calculated from the following formula (3), and the power P and the power factor $\phi$ can be calculated from the following formulas (4) and (5), respectively:

[Formula 3]

$$|I| = \sqrt{id^{*2} + iq^{*2}} \qquad (3)$$

$$P = \frac{T^*}{\omega e} \qquad (4)$$

$$\phi = \cos(\phi v - \phi i) \qquad (5)$$

Here, $$\phi v = \tan^{-1}\left(\frac{vq}{vd}\right)$$

$$\phi i = \tan^{-1}\left(\frac{iq^*}{id^*}\right)$$

Figure 19:
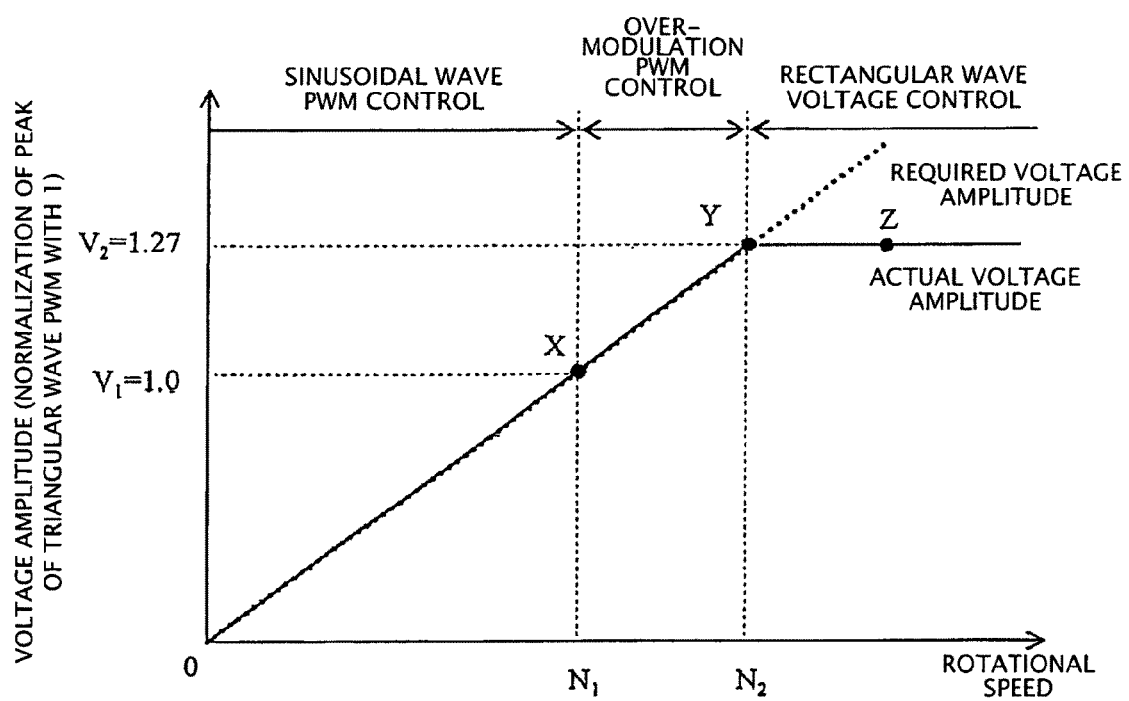
FIG. 19 is a graph illustrating an example of a relationship between the rotational speed of the AC motor and the voltage amplitude, and the drive control mode.

When sinusoidal wave modulation in which the third harmonic components are not included is performed in the sinusoidal wave PWM controller 102, the threshold voltage for control $|V_1|$ is set to the absolute value $|Vc_P|$ of the peak value of the triangular wave carrier voltage Vc. When the absolute value $|V_R|$ of the required voltage amplitude $V_R$ is less than the threshold voltage $|V_1|$, processing proceeds to step S20, and the AC motor 300 continues to be controlled by the sinusoidal wave PWM controller 102. On the other hand, when the rotational speed of the AC motor 300 increases to make the absolute value $|V_R|$ of the required voltage amplitude $V_R$ equal to or greater than the threshold voltage $|V_1|$ as indicated by a point X in FIG. 19, processing proceeds to step S22, where control of the AC motor 300 shifts from the sinusoidal wave PWM controller 102 to the overmodulation PWM controller 104. Here, in FIG. 19, the horizontal axis indicates the rotational speed and the vertical axis indicates the voltage amplitude.

When processing proceeds to step S14, determination for switching the control mode is performed in accordance with the absolute value $|V_R|$ of the required voltage amplitude $V_R$, using the absolute value $|Vc_P|$ of the peak value of the triangular wave carrier voltage as a reference. Here, the threshold voltage $|V_2|$ which is used as a reference for determination is set to 1.27 times (4/π times) the absolute value $|Vc_P|$ of the peak value of the triangular wave carrier voltage Vc.

Then, processing proceeds to step S18 when the absolute value $|V_R|$ of the required voltage amplitude $V_R$ is less than the threshold voltage $|V_2|$, and processing proceeds to step S24 when the absolute value $|V_R|$ of the required voltage amplitude $V_R$ is equal to or greater than the threshold voltage $|V_2|$. In step S18, processing proceeds to step S20 when the absolute value $|V_R|$ of the required voltage amplitude $V_R$ is less than the threshold voltage $|V_1-\alpha_1|$, and processing proceeds to step S22 when the absolute value $|V_R|$ of the required voltage amplitude $V_R$ is equal to or greater than the threshold voltage $|V_1-\alpha_1|$. Here, $\alpha_1$ is an offset voltage value having a positive value, and is used to make the threshold voltages different between the case of shifting from the sinusoidal wave PWM control mode to the overmodulation PWM control mode and the case of shifting from the overmodulation PWM control mode to the sinusoidal wave PWM control mode, so as to prevent chattering in the control of the AC motor 300 between the sinusoidal wave PWM control mode and the overmodulation PWM control mode with the threshold voltage $|V_1|$ serving as a boundary therebetween. For example, it is preferable to set $\alpha_1$ to a value which is 1% to 10% the threshold voltage $|V_1|$.

When processing proceeds to step S22, the AC motor 300 continues to be controlled by the overmodulation PWM controller 104. When the absolute value $|V_R|$ of the required voltage amplitude $V_R$ is equal to or greater than the threshold voltage $|V_2|$ as indicated by a appoint Y in FIG. 19 and processing proceeds to step S24, the control of the AC motor 300 shifts from the overmodulation PWM controller 104 to the rectangular wave voltage controller 106. On the other hand, when the absolute value $|V_R|$ of the required voltage amplitude $V_R$ is less than the threshold voltage $|V_1-\alpha_1|$ and processing proceeds to step S20, the control of the AC motor 300 is returned to the sinusoidal wave PWM controller 102 from the overmodulation PWM controller 104.

When processing proceeds to step S16, processing proceeds to step S24 when the absolute value $|V_R|$ of the required voltage amplitude $V_R$ is equal to or greater than the threshold voltage $|V_2-\alpha_2|$, and processing proceeds to step S22 when the absolute value $|V_R|$ of the required voltage amplitude $V_R$ is less than the threshold voltage $|V_2-\alpha_2|$. Here, $\alpha_2$ is an offset voltage value having a positive value, and is used to make the threshold voltages different between the case of shifting from the overmodulation PWM control mode to the rectangular wave voltage control mode and the case of shifting from the rectangular wave voltage control mode to the overmodulation PWM control mode, so as to prevent chattering in the control of the AC motor 300 between the overmodulation PWM control mode and the rectangular wave voltage control mode, with the threshold voltage $|V_2|$ serving as a boundary therebetween. For example, it is preferable to set $\alpha_2$ to a value which is 1% to 10% the threshold voltage $|V_2|$.

When processing proceeds to step S24, the AC motor 300 continues to be controlled by the rectangular wave voltage controller 106. On the other hand, when the absolute value $|V_R|$ of the required voltage amplitude $V_R$ is smaller than the threshold voltage $|V_2-\alpha_2|$ and processing proceeds to step S22, the control of the AC motor 300 is returned from the rectangular wave voltage controller 106 to the overmodulation PWM controller 104.

Figure 20:
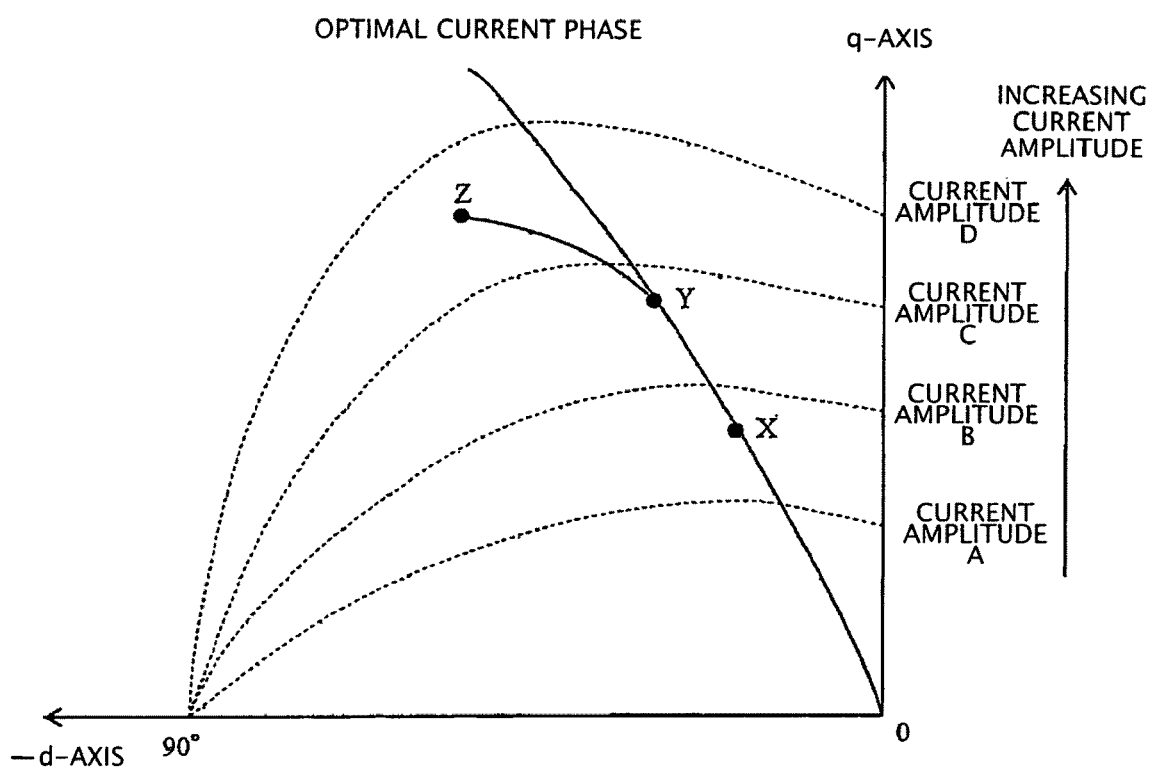
FIG. 20 is a Lissajous figure illustrating a change of the d-axis current value and the q-axis current value.

By performing switching of the control mode of the AC motor 300 by using the required voltage amplitude $V_R$ as described above, delay in switching of the control from a control state by the rectangular wave voltage controller 106 (point Z in FIGS. 19 and 20) to a control state by the overmodulation PWM controller 104 (between points X and Y in FIGS. 19 and 20) can be eliminated. This can reduce the amount of shift of the current phase of the current to be supplied to the AC motor 300 from the optimal current phase, so that hunting (oscillation) can be suppressed. Consequently, the drive control of the AC motor 300 can be stabilized.

Figure 21:
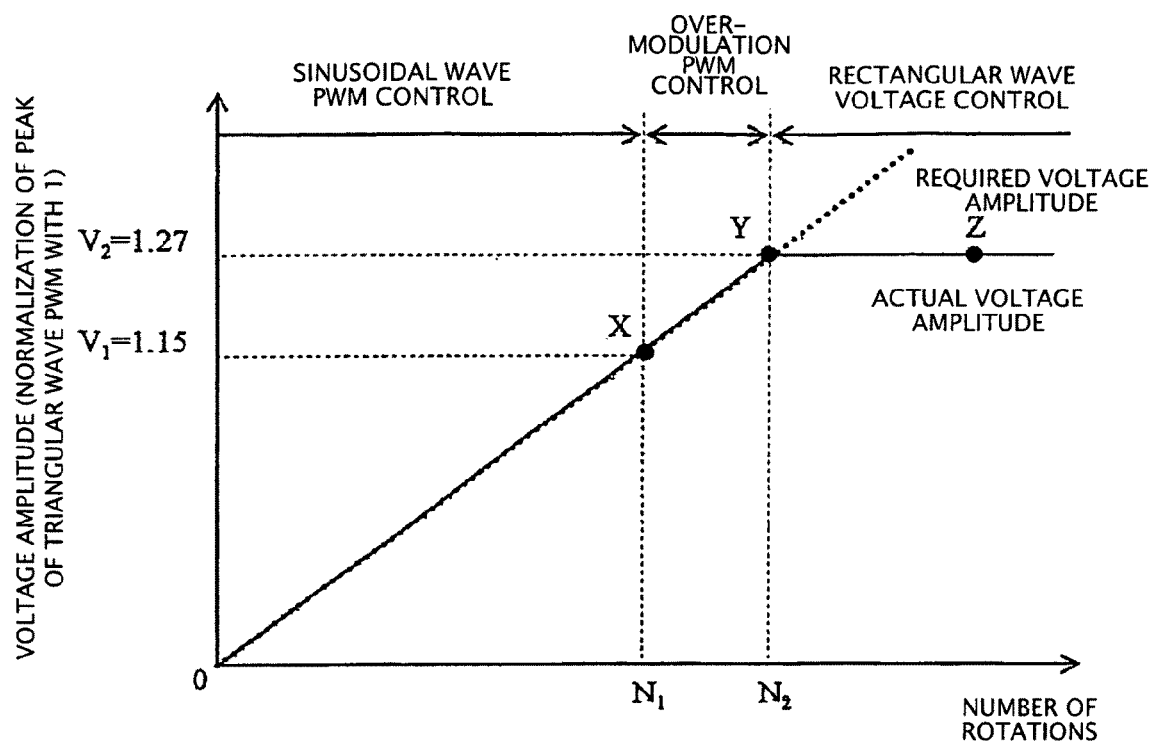
FIG. 21 is a graph illustrating an example of a relationship between the rotational speed of the AC motor and the voltage amplitude, and the drive control mode.

Here, when modulation in which the third harmonic components are included is performed in the sinusoidal wave PWM controller 102, the threshold value $|V_1|$ for control is preferably set to 1.15 times the absolute value $|Vc_P|$ of the peak value of the triangular wave carrier voltage Vc. In this case, switching of the drive control mode of the AC motor 300 in accordance with the flowchart of FIG. 18 is as shown FIG. 21. In FIG. 21, the horizontal axis indicates the rotational speed and the vertical axis indicates the voltage amplitude.

In the description of the embodiment described above, a controller which controls the voltage to be applied to the AC motor 300 is selectively switched among the sinusoidal wave PWM controller 102, the overmodulation PWM controller 104, and the rectangular wave voltage controller 106. However, in the present embodiment, it is possible to omit the rectangular wave voltage controller 106 and selectively switch between the sinusoidal wave PWM controller 102 and the overmodulation PWM controller 104 as a controller which controls the voltage to be applied to the AC motor 300.

Although embodiments for implementing the present invention have been described above, the present invention is not limited to these embodiments and can be implemented in various manners within the scope of the invention.

The invention claimed is:
1. An AC motor drive controller, comprising:
an AC motor;
an inverter; and
an overmodulation PWM controller which controls a pulse width modulation voltage which is output from the inverter and which is to be applied to the AC motor, based on a result of comparison between a phase voltage instruction in which an amplitude exceeds a peak value of a triangular wave carrier and the triangular wave carrier,
wherein
the overmodulation PWM controller includes:
a voltage instruction calculation unit which calculates a d axis voltage instruction and a q axis voltage instruction such that a d axis current and a q axis current which are detected correspond to the d axis current instruction and the q axis current instruction;
a voltage amplitude calculator which calculates a voltage instruction amplitude from the d axis voltage instruction and the q axis voltage instruction calculated by the voltage instruction calculation unit;
a voltage instruction correction unit which corrects the d axis voltage instruction and the q axis voltage instruction calculated by the voltage instruction calculation unit, such that a pulse width modulation voltage has a fundamental wave amplitude corresponding to the voltage instruction amplitude calculated by the voltage amplitude calculator;
a voltage instruction conversion unit which converts the d axis voltage instruction and the q axis voltage instruction which are corrected by the voltage instruction correction unit into a phase voltage instruction and outputs the phase voltage instruction; and
a synchronization PWM controller which controls a phase of the phase voltage instruction from the voltage instruction conversion unit and the triangular wave carrier, and wherein
the voltage instruction correction unit corrects the d axis voltage instruction and the q axis voltage instruction calculated by the voltage instruction calculation unit in accordance with a synchronization number which is a ratio fc/fm between a frequency of the triangular wave carrier fc and a frequency of the phase voltage instruction fm.

2. The AC motor drive controller according to claim 1, wherein
the voltage instruction correction unit corrects the d axis voltage instruction and the q axis voltage instruction calculated by the voltage instruction calculation unit by using amplitude characteristics having different relationships between the voltage instruction amplitude and the fundamental wave amplitude of the pulse width modulation voltage depending on the synchronization number.

3. The AC motor drive controller according to claim 1, wherein
the synchronization PWM controller determines the synchronization number based on a rotational speed of the AC motor.

4. The AC motor drive controller according to claim 1, further comprising:
a sinusoidal wave PWM controller which controls a pulse width modulation voltage which is output from the inverter and which is to be applied to the AC motor, based on a result of comparison between a phase voltage instruction in which an amplitude does not exceed a peak value of a triangular wave carrier and the triangular wave carrier; and
a control switching unit which selectively switches between the sinusoidal wave PWM controller and the overmodulation PWM controller serving as a controller which controls the voltage to be applied to the AC motor.

5. An AC motor drive controller, comprising:
an AC motor;
an inverter; and
an overmodulation PWM controller which controls a pulse width modulation voltage which is output from the inverter and which is to be applied to the AC motor, based on a result of comparison between a phase voltage instruction in which an amplitude exceeds a peak value of a triangular wave carrier and the triangular wave carrier, wherein
the overmodulation PWM controller includes:
a voltage instruction calculation unit which calculates a d axis voltage instruction and a q axis voltage instruction such that a d axis current and a q axis current which are detected correspond to the d axis current instruction and the q axis current instruction;
a voltage amplitude calculator which calculates a voltage instruction amplitude from the d axis voltage instruction and the q axis voltage instruction calculated by the voltage instruction calculation unit;
a voltage instruction correction unit which corrects the d axis voltage instruction and the q axis voltage instruction calculated by the voltage instruction calculation unit, such that a pulse width modulation voltage has a fundamental wave amplitude corresponding to the voltage instruction amplitude calculated by the voltage amplitude calculator;
a voltage instruction conversion unit which converts the d axis voltage instruction and the q axis voltage instruction which are corrected by the voltage instruction correction unit into a phase voltage instruction and outputs the phase voltage instruction; and
a synchronization PWM controller which controls a phase of the phase voltage instruction from the voltage instruction conversion unit and the triangular wave carrier, and wherein
the phase voltage instruction which is compared with the triangular wave carrier is updated for each predetermined cycle, and
the voltage instruction correction unit corrects the d axis voltage instruction and the q axis voltage instruction calculated by the voltage instruction calculation unit, such that the voltage instruction amplitude calculated by the voltage amplitude calculation unit is corrected in accordance with update timing of the phase voltage instruction with respect to the triangular wave carrier.

6. The AC motor drive controller according to claim 5, wherein
the voltage instruction correction unit corrects the d axis voltage instruction and the q axis voltage instruction calculated by the voltage instruction calculation unit by using amplitude characteristics having different relationships between the voltage instruction amplitude and the fundamental wave amplitude of the pulse width modulation voltage depending on the update timing of the phase voltage instruction.

7. The AC motor drive controller according to claim 5, further comprising:
a sinusoidal wave PWM controller which controls a pulse width modulation voltage which is output from the inverter and which is to be applied to the AC motor, based on a result of comparison between a phase voltage instruction in which an amplitude does not exceed a peak value of a triangular wave carrier and the triangular wave carrier;
a rectangular wave voltage controller which controls a phase of a rectangular wave voltage in which one pulse is output per one cycle of the phase voltage instruction, to control a rectangular wave voltage which is output from the inverter and which is to be applied to the AC motor; and
a control switching unit which selectively switches among the sinusoidal wave PWM controller, the overmodulation PWM controller, and the rectangular wave voltage controller, serving as a controller which controls the voltage to be applied to the AC motor.

* * * * *